United States Patent
Wang et al.

(10) Patent No.: US 10,854,955 B2
(45) Date of Patent: Dec. 1, 2020

(54) ELECTRONIC DEVICE, MOBILE TERMINAL AND ANTENNA ASSEMBLY

(71) Applicant: GUANGDONG OPPO MOBILE TELECOMMUNICATIONS CORP., LTD., Guangdong (CN)

(72) Inventors: Xinbao Wang, Guangdong (CN); Ning Zhao, Guangdong (CN); Liang Gu, Guangdong (CN); Tianping Liang, Guangdong (CN); Yantao Li, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 18 days.

(21) Appl. No.: 16/265,499

(22) Filed: Feb. 1, 2019

(65) Prior Publication Data
US 2019/0305403 A1   Oct. 3, 2019

(30) Foreign Application Priority Data

Mar. 31, 2018   (CN) .......................... 2018 1 0278705
Mar. 31, 2018   (CN) .......................... 2018 1 0282842

(51) Int. Cl.
*H01Q 1/24*       (2006.01)
*H04M 1/02*       (2006.01)
(Continued)

(52) U.S. Cl.
CPC ............... *H01Q 1/243* (2013.01); *H01Q 1/10* (2013.01); *H01Q 1/241* (2013.01); *H01Q 1/244* (2013.01);
(Continued)

(58) Field of Classification Search
CPC .......... H01Q 1/243; H01Q 1/244; H01Q 9/04; H01Q 1/241; H01Q 1/10; H04M 1/0237; H04M 1/0264
(Continued)

(56) References Cited

U.S. PATENT DOCUMENTS 6,441,789 B1 *   8/2002   Sasano ................... H01Q 1/244
                                                          343/702
6,476,776 B1 *  11/2002   Kurby .................... H01Q 1/244
                                                          343/700 MS
(Continued)

FOREIGN PATENT DOCUMENTS

CN           2596563 Y        12/2003
CN         102118464 A         7/2011
(Continued)

OTHER PUBLICATIONS

International search report for Application No. PCT/CN2019/072042, dated Apr. 3, 2019 (4 pages).
(Continued)

*Primary Examiner* — Don P Le
(74) *Attorney, Agent, or Firm* — Ladas & Parry LLP

(57) ABSTRACT

The present disclosure provides an electronic device, a mobile terminal and an antenna assembly. The electronic device includes: a case defining an accommodating groove; a movable support slidably connected to the case, and capable of moving out of or retracting into the accommodating groove; and a first antenna installed on the movable support. Since the first antenna may be ejected out of the accommodating groove along with the movable support, influence of other components disposed inside the electronic device on the first antenna may be reduced. Thus, the implementation of the present disclosure may improve antenna performance of the electronic device.

19 Claims, 16 Drawing Sheets

(51) Int. Cl.
*H01Q 9/04* (2006.01)
*H01Q 1/10* (2006.01)

(52) U.S. Cl.
CPC .......... *H01Q 9/04* (2013.01); *H04M 1/0237* (2013.01); *H04M 1/0264* (2013.01)

(58) Field of Classification Search
USPC ........................................................ 343/702
See application file for complete search history.

(56) References Cited

U.S. PATENT DOCUMENTS

| | | | |
|---|---|---|---|
| 6,545,643 B1 | 4/2003 | Sward et al. | |
| 7,463,202 B2 | 12/2008 | Zarnowitz et al. | |
| 2005/0285798 A1* | 12/2005 | van Wonterghem | H01Q 9/0421 343/702 |
| 2006/0001581 A1* | 1/2006 | Lee | H04M 1/0235 343/702 |
| 2006/0290577 A1* | 12/2006 | Ozkar | H01Q 1/36 343/702 |
| 2007/0035454 A1* | 2/2007 | Zarnowitz | H01Q 1/244 343/702 |
| 2008/0074329 A1* | 3/2008 | Caballero | H01Q 1/243 343/702 |
| 2009/0124306 A1* | 5/2009 | Kim | H01Q 1/245 455/575.1 |
| 2011/0117958 A1* | 5/2011 | Kim | H04M 1/0264 455/556.1 |
| 2012/0169567 A1* | 7/2012 | Kim | H01Q 1/241 343/876 |
| 2012/0223871 A1 | 9/2012 | Chen | |
| 2013/0184032 A1* | 7/2013 | Choi | H04M 1/0264 455/556.1 |
| 2013/0300626 A1* | 11/2013 | Lee | H01Q 5/378 343/850 |
| 2015/0070840 A1* | 3/2015 | Rappoport | H05K 1/0281 361/679.56 |

FOREIGN PATENT DOCUMENTS

| | | |
|---|---|---|
| CN | 101562270 B | 8/2012 |
| CN | 102938491 A | 2/2013 |
| CN | 105552525 A | 5/2016 |
| CN | 205320124 U | 6/2016 |
| CN | 105932395 A | 9/2016 |
| CN | 106790801 A | 5/2017 |
| CN | 107360278 A | 11/2017 |
| JP | 2002176307 A | 6/2002 |
| KR | 1020050087489 A | 8/2005 |
| TW | 200522430 | 7/2005 |

OTHER PUBLICATIONS

Search report by the European Patent Office in European Patent Application No. EP19154576, dated Jul. 11, 2019 (17 pages).
European search report for Application No. EP19154576.3, dated Jul. 23, 2019 (15 pages).
First Office Action from China patent office in a counterpart Chinese patent Application 201810278705.8 dated Mar. 16, 2020 (13 pages).
First Office Action from China patent office in a counterpart Chinese patent Application 201810282842.9 dated Mar. 20, 2020 (20 pages).
Chinese Second office action from China patent office in a counterpart Chinese patent Application 201810278705.8, dated Aug. 17, 2020 (27 pages).

* cited by examiner

US 10,854,955 B2

ELECTRONIC DEVICE, MOBILE TERMINAL AND ANTENNA ASSEMBLY

CROSS-REFERENCE TO RELATED APPLICATIONS

The present application claims foreign priority of Chinese Patent Application No. 201810282842.9, filed on Mar. 31, 2018, and Chinese Application No. 201810278705.8, filed on Mar. 31, 2018 in the State Intellectual Property Office of China, the entire contents of which are hereby incorporated by reference.

TECHNICAL FIELD

The present disclosure relates to the communication technology, and in particular to an electronic device, a mobile terminal and an antenna assembly.

BACKGROUND

Electronic devices (such as cellphone, tablet PC and other mobile terminals) usually include one or more internal antenna for realizing communication function. Performance of the internal antenna may be disadvantaged because of the shielding effect of the case of the electronic device. As the electronic devices become thinner and lighter, the inner space of an electronic device becomes more and more limited, which also limits the clearance area of antenna. Thus, the antenna is easily interfered.

BRIEF DESCRIPTION OF THE DRAWINGS

In order to clearly explain the technical solutions in the embodiments of the present disclosure, the drawings used in the description of the embodiments will be briefly described below. Obviously, the drawings in the following description are merely some embodiments of the present disclosure. For those of ordinary skill in the art, other drawings may also be obtained based on these drawings without any creative work.

DETAILED DESCRIPTION

The disclosure will now be described in detail with reference to the accompanying drawings and examples. Apparently, the described embodiments are only a part of the embodiments of the present disclosure, not all of the embodiments. All other embodiments obtained by a person of ordinary skill in the art based on the embodiments of the present invention without creative efforts shall fall within the protection scope of the present invention.

Figure 1:
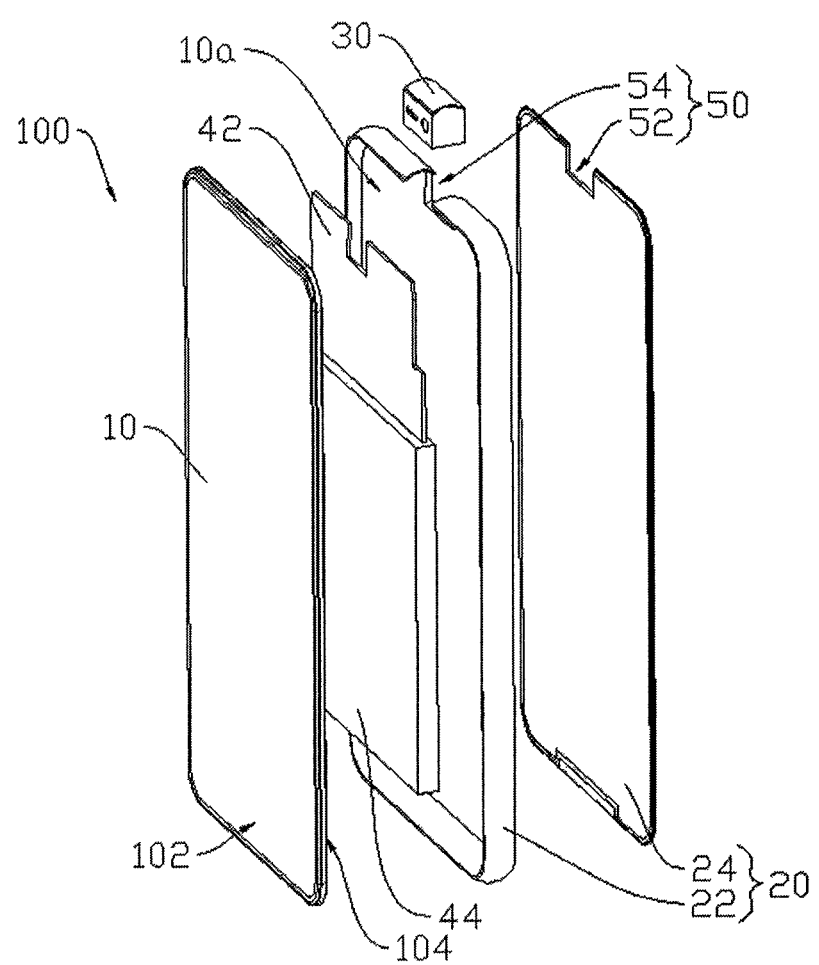
FIG. 1 illustrates an exploded view of an electronic device according to an embodiment of the present disclosure.

Referring to FIG. 1, the electronic device 100 of an embodiment of the present disclosure may include a display 10, a case 20 and a movable support 30. Specifically, the display 10 may be a thin film transistor liquid crystal display (TFT-LCD) or an organic light-emitting diode (OLED) display. Further, the display 10 may only be a display with displaying function, or alternatively be a display integrated with touch-control function. In this embodiment, the display 10 may include a display surface 102 and a non-display surface 104. The display surface 102 may faces the user and be utilized to show images, and the non-display surface 104 faces inwards the electronic device 100.

Referring to FIG. 1, the display 10 may be disposed on the case 20, and cover the case 20. Referring FIGS. 2 to 5, FIGS. 2 and 3 each shows a front view of the electronic device 100, and FIGS. 4 and 5 each shows a back view of the electronic device 100. The case 20 may include a left surface 202 and a right surface 204 opposite to the left surface 202. Referring to FIG. 6, FIG. 6 is a section view of the electronic device of FIG. 4 taken along the line A-A. For better illustrating the position relation of the case 20 and the display 10, the movable support 30 is not shown in FIG. 6. The case 20 may further include a front surface 206 and a back surface 208 each connected between the left surface 202 and the right surface 204. The front surface 206 may refer to the surface of the case 20 which faces the user when the user uses the electronic device 100. The back surface 208 may refer to the surface of the case 20 which is opposite to the user when the user uses the electronic device 100. The left surface 202 and the right surface 204 may refer to the surfaces substantially parallel to the thickness direction of the electronic device 100. In this embodiment, the display 10 may be connected to the front surface 206 with the non-display surface 104 facing the front surface 206 of the case 20. For example, the display 10 may be attached directly or indirectly on the front surface 206.

Referring to FIG. 1, in this embodiment, an end of the case 20 may define an accommodating groove 50. In some embodiments, the accommodating groove 50 may be located at the top end of the case 20. The accommodating groove 50 may communicate the inside and the outside of the case 20. Specifically, the inside of the case 20 may refer to the inner space 10a formed between the display 10 and the case 20. In this embodiment, the width of the accommodating groove 50 may be less than the distance between the left surface 202 and the right surface 204, that is, the accommodating groove 40 does not extend through the left surface 202 and the right surface 204 of the case 20. In this circumstance, the accommodating groove 50 may have three walls and an opening, and may represent a U-shaped configuration.

Figure 2:
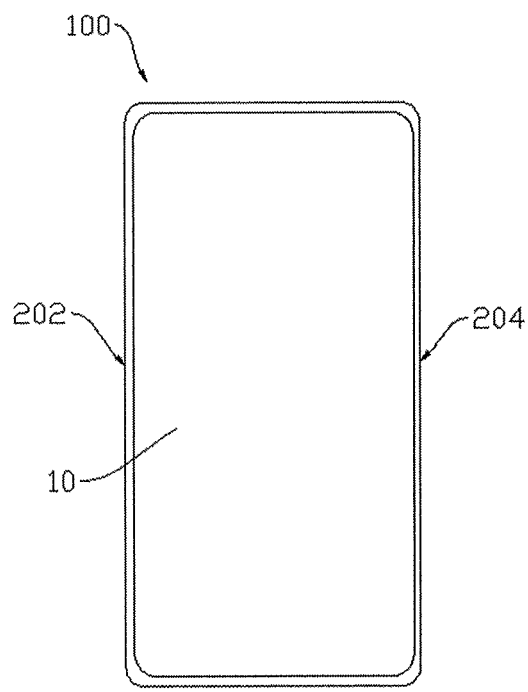
FIGS. 2 and 3 each illustrates a front view of an electronic device according to an embodiment of the present disclosure.
Figure 3:
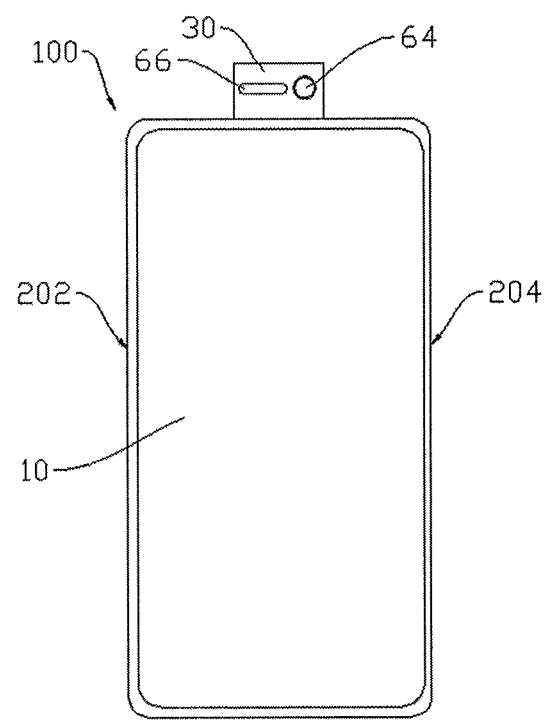
Figure 4:
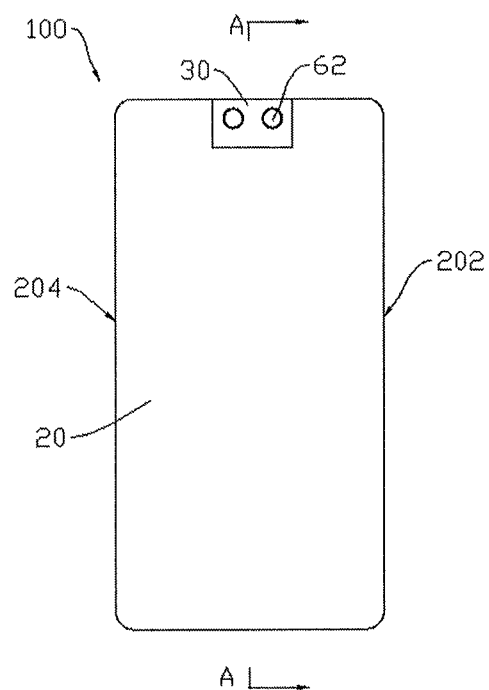
FIGS. 4 and 5 each illustrates a back view of an electronic device according to an embodiment of the present disclosure.
Figure 5:
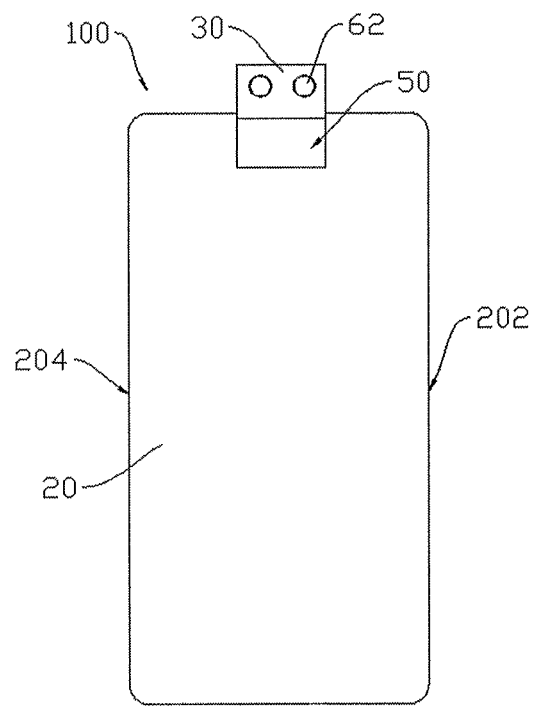
Figure 6:
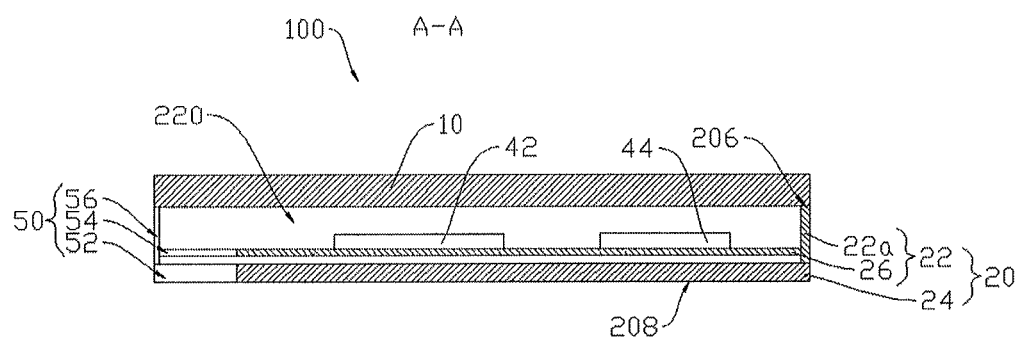
FIG. 6 is a section view of the electronic device of FIG. 4 taken along the line A-A.
Figure 7:
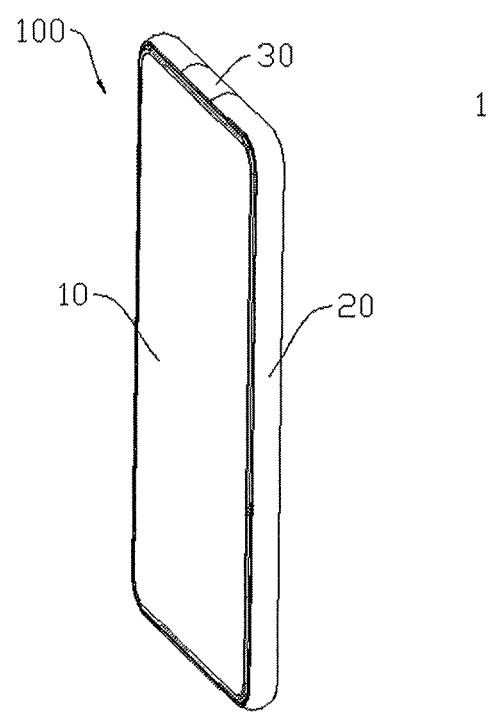
FIGS. 7-10 each illustrates a perspective view of an electronic device according to a respective embodiment of the present disclosure.
Figure 8:
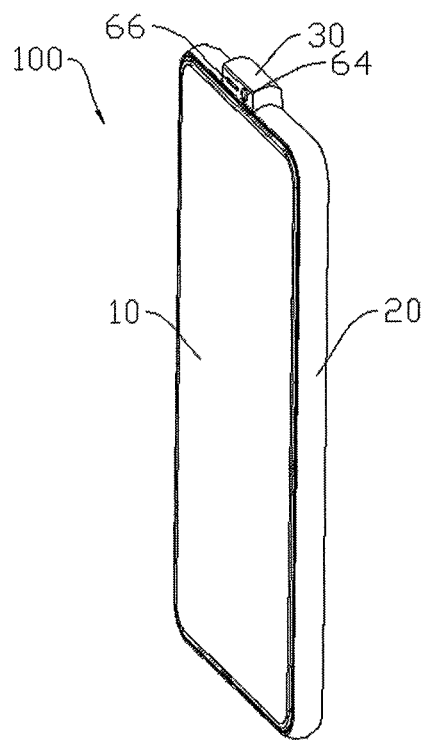
Figure 9:
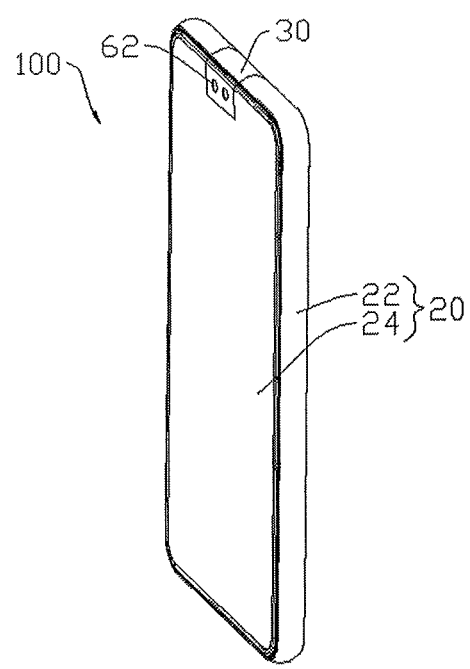

Referring to FIGS. 2 to 10, in some embodiments, the movable support 30 may be slidably connected with the case 20. Specifically, the movable support 30 may be slidably connected to the accommodating groove 50 of the case 20. In other words, the movable support 30 may move out of or retract into the accommodating groove 50. Specifically, FIG. 2 shows a front view of the electronic device 100 where the movable support 30 is received in the accommodating groove 50, FIG. 3 shows another front view of the electronic device 100 where the movable support 30 moves out of the accommodating groove 50, FIG. 4 shows a back view of the electronic device 100 where the movable support 30 is received in the accommodating groove 50, and FIG. 5 shows another back view of the electronic device 100 where the movable support 30 moves out of the accommodating groove 50. FIG. 6 is a section view of the electronic device 100, and the movable support 30 is not shown in this figure. FIGS. 7 and 9 each shows a perspective view of the electronic device 100 when the movable support 30 is received in the accommodating groove 50, and FIGS. 8 and 10 each shows a perspective view of the electronic device 100 when the movable support 30 moves out of the accommodating groove 50. The shape and size of the movable support 30 may match those of the accommodating groove 50. Accordingly, the movable support 30 may be completely received in the accommodating groove 50. When the movable support 30 is completely received in the accommodating groove 50, the movable support 30 may fill the whole accommodating groove 50 such that the movable support 30 and the case 20 may constitute an integral structure. The back surface 208 of the case 20 may be smoothly connected with the outer surface of the movable support 30, such that the appearance of the electronic device may be improved. In some embodiments, the movable support 30 may have a hollow configuration which allows a functional device 60 to be installed therein. In this embodiment, the movable support 30 may slide along the length direction of the electronic device 100. When the movable support 30 moves out of the accommodating groove 50, the movable support 30 may extend beyond the electronic device 100 along the length direction of the electronic device 100. When the movable support 30 is received in the accommodating groove 50, the movable support 30 and the case 20 may constitute a continuous case structure.

Figure 11:
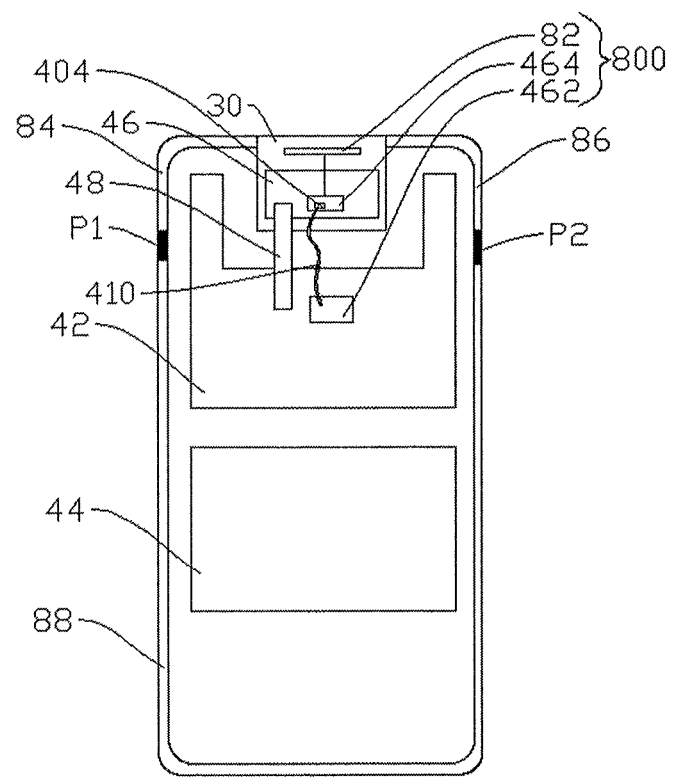
FIGS. 11 and 12 each shows an exemplary inner structure of an electronic device according to an embodiment of the present disclosure.
Figure 12:
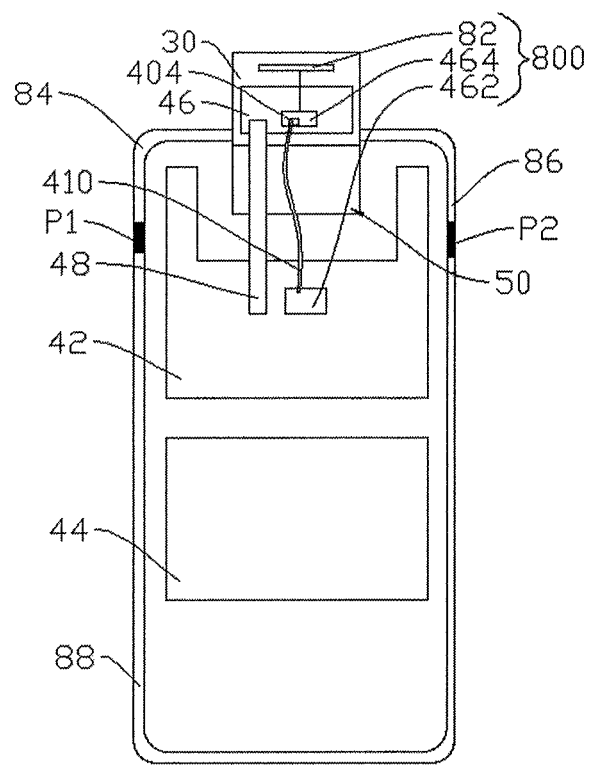

Referring to FIGS. 11 and 12, FIG. 11 shows the inner structure of the electronic device 100 with the movable support 30 received in the accommodating groove 50, and FIG. 12 shows the inner structure of the electronic device 100 with the movable support 30 moving outside the accommodating groove 50. In this embodiment, the electronic device 100 may further include an antenna module 800. At least part of the antenna module 800 may be disposed on the movable support 30. Specifically, the first antenna 82 of the antenna module 800 may be disposed on the movable support 30. When the movable support 30 moves towards the case 20 (i.e., inwards the accommodating groove 50), the first antenna 82 may be located within the accommodating groove 50, that is, the first antenna 82 may be received inside the case 20 in this situation. When the movable support 30 moves away from the case 20 (i.e., outwards the accommodating groove 50), the first antenna 82 may be located outside the accommodating groove 50, that is, the first antenna 82 may be located outside the case 20. Specifically, the first antenna 82 may be disposed inside the movable support 30 or on the surface of the movable support 30. In one embodiment, the first antenna 82 may be a metal sheet. Apparently, in other embodiments, the first antenna 82 may be a sheet or a strip made of any material capable of radiating signals. The first antenna 82 may be utilized to radiate at least one of WIFI signals, LTE signals, millimeter wave signals, GPS signals, GSM signals or Bluetooth signals. In some embodiments, the first antenna 82 radiates electromagnetic signals no matter whether the movable support 30 moves out of the accommodating groove 50 or is received in the accommodating groove 50 (as shown in FIGS. 11 and 12). In other embodiments, the first antenna 82 does not radiate electromagnetic signals when the movable support 30 is received in the accommodating groove 50 (as shown in FIG. 11), and the first antenna 82 radiate electromagnetic signals when the movable support 30 moves out of the accommodating groove 50 (as shown in FIG. 12). Since the first antenna 82 radiates electromagnetic signals when it moves out of the case 20, influence of the display 10 and other components on the first antenna 82 may be reduced, and the radiation effect of the first antenna 82 may be improved. When the movable support 30 is received in the accommodating groove 50, the first antenna 82 is hidden inside the case 20, thus the portability of the electronic device 100 may be improved. Furthermore, the arrangement of the first antenna 82 does not occupy the display area of the display 10, which may allow the increase of the screen-to-body ratio and thus improve user experience.

Figure 28:
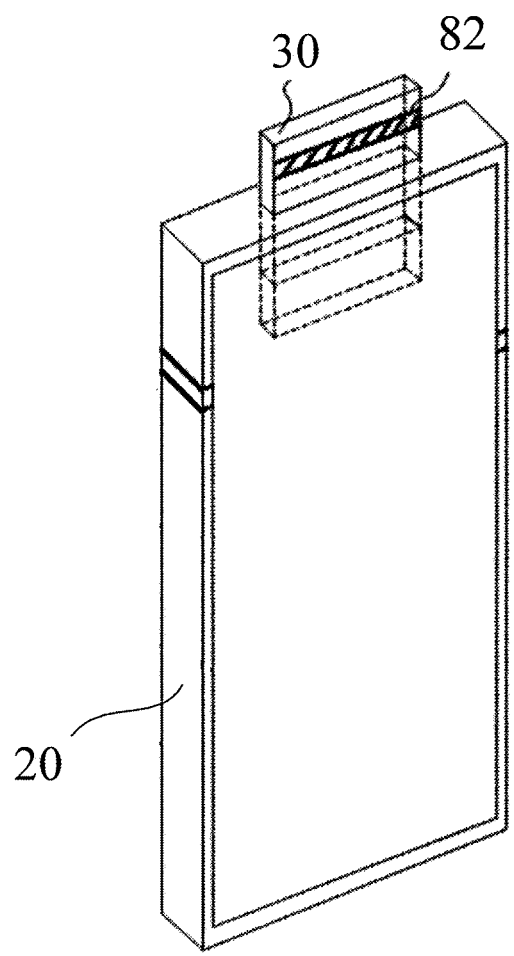
FIG. 28 illustrates a perspective view of an electronic device according to an embodiment of the present disclosure.
Figure 29:
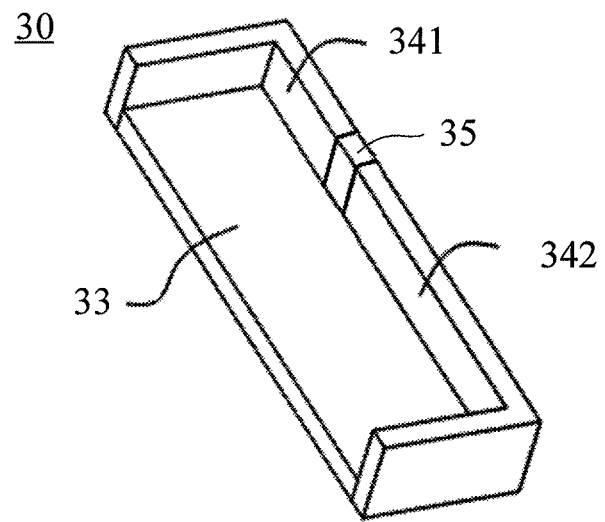
FIG. 29 shows a perspective view of a movable support according to an embodiment of the present disclosure.
Figure 30:
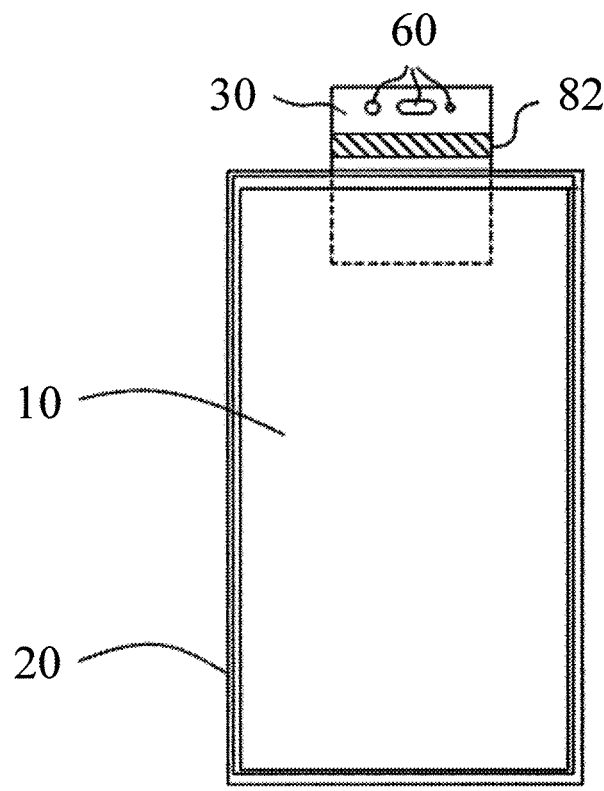
FIG. 30 illustrates a front view of an electronic device according to an embodiment of the present disclosure.

In one embodiment, as shown in FIG. 28, the first antenna 82 may be a conductive material layer formed on the surface of the movable support 30. For example, the first antenna 82 may correspond to a LDS (Laser Direct Structuring) antenna or PDS (Print Direct Structuring) antenna. In another embodiment, the first antenna 82 may be a flexible printed circuit board arranged on the surface of the movable support 30, i.e., a FPC antenna. In yet another embodiment, as shown in FIG. 29, the first antenna 82 may be a frame antenna. The movable support 30 may include a middle plate 33 and multiple support frames (341 and 342) disposed around the middle plate 33. The support frames (341 and 342) may be spaced apart by one or more spacing portion 35. There may be set multiple spacing portions 35. One spacing portion 35 is shown in FIG. 2 only for illustration purpose. It should be understood that the number of the spacing portion(s) 35 may be larger than one. When there are two or more spacing portions 35, these spacing portions 35 are spaced apart from each other. Each support frame 341 or 342 may act as the first antenna 82 for transmitting and receiving signals. In other words, the first antenna 82 may surround the middle frame 33 and be utilized as the support frame 341 or 342 of the movable support 30. The first antenna 82 may have any proper operating frequency and function. For example, the first antenna 82 may be a 2G antenna, 3G antenna, 4G antenna, 5G antenna, BT (Blue Tooth) antenna, GPS antenna, WIFI antenna, GSM antenna, LTE antenna or millimeter wave antenna. The number of the first antenna(s) 14 may be one, two or more.

In some embodiments, the movable support 30 may be driven by a driving mechanism or be controlled manually by a user. Different exemplary application scenarios of the movable support 30 include, but are not limited to, the following situations.

In one embodiment, the first antenna 82 may be a radiator for radiating GSM signals. In an initial state, the movable support 30 is received in the accommodating groove 50. When the user makes or receives a phone call, the movable support 30 may move out automatically. In this way, the first antenna 82 is ejected outside the accommodating groove 50 such that the first antenna 82 may radiate GSM signals more effectively, thereby improving connection quality.

In one embodiment, the first antenna 82 may be a radiator for radiating Bluetooth signals. In an initial state, the movable support 30 is received in the accommodating groove 50. When the user enables the Bluetooth function of the electronic device 100, or when the electronic device 100 has matched another Bluetooth device and is about to transmit data, the movable support 30 may move out automatically. Since the first antenna 82 is located outside the accommodating groove 50, the effect that the first antenna 82 radiates Bluetooth signals as well as the data transmission quality may be improved.

In one embodiment, the first antenna 82 may be a radiator for radiating GPS signals. In an initial state, the movable support 30 is received in the accommodating groove 50. When the user enables an application such as electronic map or navigation application of the electronic device 100, the movable support 30 may move out automatically. Since the first antenna 82 is located outside the accommodating groove 50, the effect that the first antenna 82 radiates GPS signals as well as the location precision may be improved.

Figure 13:
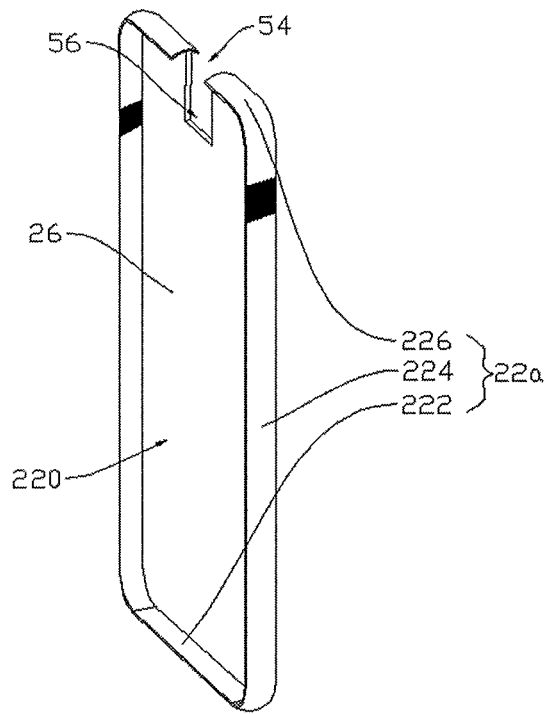
FIG. 13 is a perspective view of a middle frame of an electronic device according to an embodiment of the present disclosure.
Figure 14:
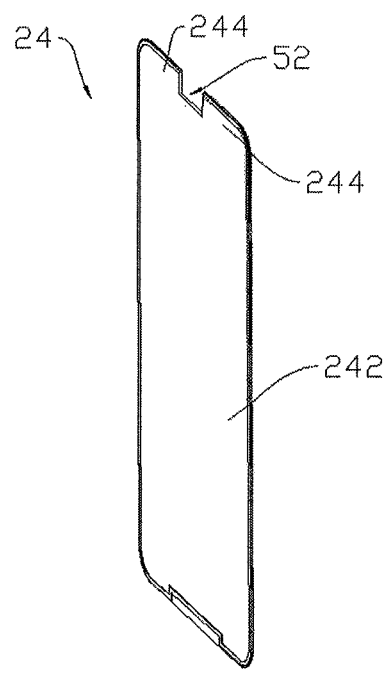
FIG. 14 is a perspective view of a back cover of an electronic device according to an embodiment of the present disclosure.

Referring to FIG. 1, in this embodiment, the case 20 may include a middle frame 22 and a back cover 24. The back cover 24 and the display 10 may be respectively located at two opposite sides of the middle frame 22. Referring also to FIG. 13, the middle frame 22 may include a side frame 22a and a support plate 26. The side frame 22a may be a frame structure, and edges of the support plate 26 may be fixed to the inner surface of the side frame 22a. As shown in FIG. 1, the back case 24 may have a plate configuration. In some embodiments, the side frame 22a of the middle frame 22 may be connected to the fringe of the back cover 24. In this embodiment, the side frame 22a and the back cover 24 may be adhered together such that the middle frame 22 and the back cover 24 may be connected. In some embodiments, the side frame 22a may be made of metal while the back cover 24 may be made of glass. Referring to FIG. 14, the back cover 24 may include a main portion 242 and a pair of protrusions 244 integrally formed. The pair of protrusions 244 may be located at one end of the main portion 242. The pair of protrusions 244 may be spaced apart so as to form a spacing gap 52 therebetween. Referring also to FIGS. 6 and 13, the middle frame 22 may define an opening 54 located corresponding to the spacing gap 52. Thus, the spacing gap 52 and the opening 54 may cooperatively constitute the accommodating groove 50. In other words, the accommodating groove 50 may extend through the middle frame 22 and the back cover 24 along the thickness direction of the electronic device 100. Accordingly, in the thickness direction of the electronic device 100, one side of the movable support 30 which is opposite to the display 10 is not shielded by the back cover 24. When the movable support 30 is received in the accommodating groove 50, the electromagnetic signals emitted by the first antenna 82 on the movable support 30 is not shielded by the back cover 24. Therefore, the radiation effect of the first antenna 82 may be ensured, thereby improving the communication quality of the electronic device 100 as well as user experience.

Referring to FIG. 13, in some embodiment, the support plate 26 may be located at the inner side of the middle frame 22. Specifically, edges of the support plate 26 may be fixed to the inner surface of the side frame 22a. In this embodiment, the side frame 22a may include a bottom sub-frame 222, a pair of side sub-frames 224 and a pair of top sub-frames 226. The pair of top sub-frames 226 are spaced apart by the opening 54. One top sub-frame 226, one side sub-frame 224, the bottom sub-frame 222, the other side sub-frame 224 and the other top sub-frame 226 may be connected sequentially, and surround the edges of the support plate 26. Accordingly, the side frame 22a and the support 26 may cooperatively define a receiving space 220. Referring to FIGS. 6, 11 and 12, the electronic device 100 may further include a first circuit board 42. The first circuit board 42 may be installed on the support plate 26. The first circuit board 42 may be electrically connected to the first antenna 82 so as to provide driving signals to the first antenna 82. Specifically, the first circuit board 42 may be a circuit board integrated with several electronic components such as control chip. The first circuit board 42 may control the first antenna 82 to transmit electromagnetic signals for transmitting information. In some embodiments, the support board 26 may be made by die-casting or CNC processing with raw metal material such as aluminum or aluminum alloy, such that the support plate 26 may have enough structural strength and will not increase significantly the total weight of the electronic device 100. In this embodiment, the first circuit board 42 may be adhered on the support plate 26, or alternatively be detachably connected to the support plate 26 by screws or bolts. Furthermore, the electronic device 100 may include a battery 44. The battery 44 may be electrically connected to the first circuit board 42 and other electronic components of the electronic device 100 so as to provide energy to the first circuit board 42 and other electronic components of the electronic device 100.

Referring to FIGS. 6 and 13, in some embodiments, one end of the support plate 26 may define an avoiding space 56. The avoiding space 56 may face directly the spacing gap 52. When the movable support 30 is received in the accommodating groove 50, the movable support 30 may be partially located inside the avoiding space 56. Specifically, the avoiding space 56 may have a similar shape as the spacing gap 52, that is, the shape of the avoiding space 56 matches that of the movable support 30. The avoiding space 56 may be utilized to receive the movable support 30. When the movable support 30 is received in the accommodating groove 50, the location of the movable support 30 will not interfere with that of the support plate 26. Further, the vertical projection of the first circuit board 42 (or other components) on the plane of the support plate 26 may be within the support plate 26 or outside the avoiding space 56. Accordingly, when the movable support 30 is received in the accommodating groove 50, the position of the first circuit board 42 (or other components) will not interfere with that of the movable support 30.

Referring to FIGS. 2 to 5, 7, 10 and 30, in some embodiments, the movable support 30 may be integrated with a functional device 60. Specifically, the functional device 60 may correspond to at least one of a camera, flash, structured light sensor, proximity sensor, light sensor, iris recognition module, transmitter module, fingerprint module or phone receiver. When the movable support 30 is received in the accommodating groove 50, the functional device 60 may be received inside the case 20. When the movable support 30 moves out of the accommodating groove 50, the functional device 60 may also be located partially or completely outside the case 20.

In related art, a functional device is usually fixed in the non-display area of the display screen, and the non-display area may shield the function device. In this circumstance, the screen-to-body ratio is very limited. In contrast, the functional device 60 of the present disclosure may be disposed on the movable support 30. The functional device 60 may move out of the case in accordance with the movement of the movable support 30. Thus, the non-display area for shielding the functional device 60 may be canceled, and the display area of the screen may be enlarged. Thus, the screen-to-body ratio may be increased, and user experience may be improved.

Figure 10:
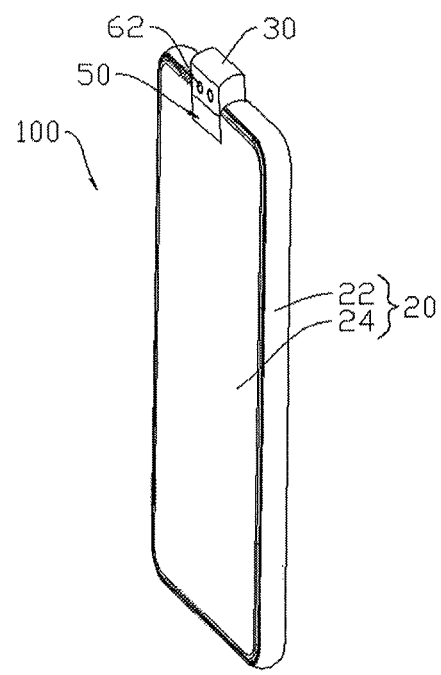

Referring to FIGS. 4, 5, 9 and 10, in some embodiments, the functional device 60 may include a back camera 62. The back camera 62 may be located on a surface of the movable support 30 opposite to the display 10. The back camera 62 is utilized for photographing in a direction opposite to the display direction of the display 10. When the user uses the back camera 62, the display 10 may face the user and the back camera 62 may face the items in front of the user. The number of the back camera(s) 62 may be one or more. For example, a dual-camera module including two cameras may be utilized for obtaining better photographing effect. In some embodiments, a flash may be set close to the back camera 62 to improve the photographing effect of the back camera 62 in dark environment. In some embodiments, the back camera 62 may always be exposed. For example, as shown in FIGS. 5 and 10, when the movable support 30 moves out of the accommodating groove 50, the back camera 62 may function normally. As shown in FIGS. 4 and 9, when the movable support 30 is received in the accommodating groove 50, the back camera 62 may also function normally. The photographing direction and effect of the back camera 62 may be different in the two situations where the movable support 30 is located outside or inside the accommodating groove 50. Further, the photographing mode of the back camera 62 may be determined based on the state of the movable support 30 so as to provide different photographing effects. Since the back camera 62 may always operate no matter whether the movable support 30 is received in or ejected out of the accommodating groove 50, the electronic device 100 may accordingly have various function modes.

Referring to FIGS. 2, 3, 7 and 8, in some embodiments, the functional device 60 may include a front camera 64, the front camera 64 may be disposed on the side of the movable support 30 which faces towards the display 10. The photographing direction of the front camera 64 may be same as the display direction of the display 10. When the user uses the front camera 64 for photographing, the display 10 may face directly the user, and the front camera 64 may be utilized to photograph the user, that is, for taking selfie. The number of the front camera 64 may be one or more. For example, a dual-camera module including two cameras may be utilized for better photographing effect. In some embodiments, a flash may be set close to the front camera 64 so as to enhance the photographing effect of the front camera 64 in dark environment. In this embodiments, the front camera 64 may be switched between an exposed state and a hidden state. Specifically, as shown in FIGS. 3 and 8, when the movable support 30 moves out of the accommodating groove 50, the front camera 64 may be exposed and function normally. As shown in FIGS. 2 and 7, when the movable support 30 is received in the accommodating groove 50, the front camera 64 may be hidden behind the display 10 and does not operate. The state of the front camera 64 may be determined based on the movement of the movable support 30. The front camera 64 does not occupy the display area of the display 10, which may allow the size of the display 10 to be increased, thereby increasing screen-to-body ratio.

Referring to FIGS. 2, 3, 7 and 8, in some embodiments, the functional device 60 may further include a phone receiver 66. The sound hole of the phone receiver 66 may be located at the side of the movable support 30 which faces the display 10. When the movable support 30 is received in the accommodating groove 50, the display 10 may cover the phone receiver 66. In this embodiments, the phone receiver 66 may be switched between an exposed state and a hidden state. Specifically, as shown in FIGS. 3 and 8, when the movable support 30 moves out of the accommodating groove 50, the phone receiver 66 may be exposed and may function normally. As shown in FIGS. 2 and 7, when the movable support 30 is received in the accommodating groove 50, the phone receiver 66 may be hidden behind the display 10 and does not operate. The state of the phone receiver 66 may be determined based on the movement of the movable support 30. The phone receiver 66 does not occupy the display area of the display 10, which may allow the size of the display 10 to be increased, thereby increasing screen-to-body ratio.

Referring to FIGS. 11 and 12, in some embodiments, the functional device 60 may be electrically connected to the first circuit board 42 through a flexible printed circuit board (FPC) 48. Specifically, a second circuit board 46 may be set on the movable support 30. The functional device 60 may be electrically connected to the second circuit board 46, and the second circuit board 46 may be electrically connected to the first circuit board 42 through the FPC 48. Thus, the first circuit board 42 may be electrically connected to the functional device 60 so as to control the operation of the functional device 60. Moreover, the battery 44 electrically connected to the first circuit board 42 may provide energy to the functional device 60.

Figure 15:
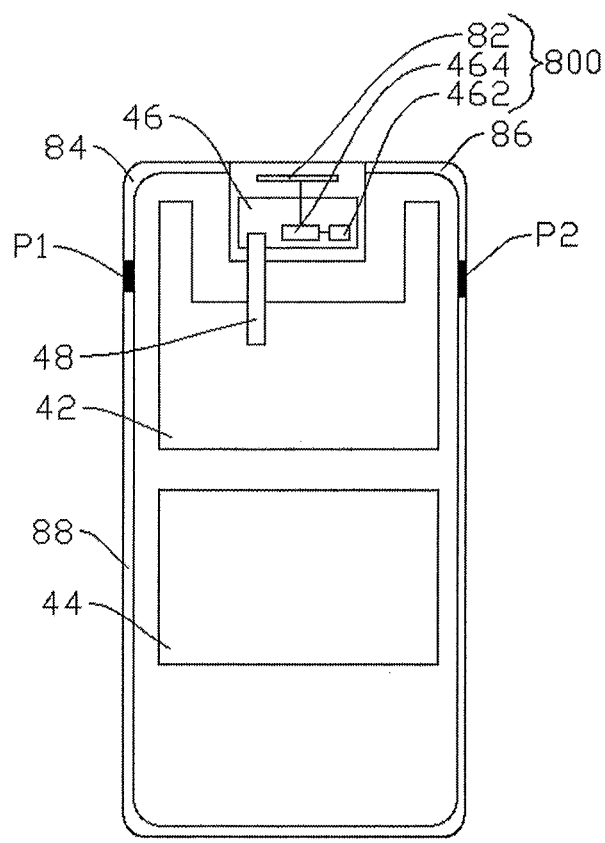
FIG. 15 shows an exemplary inner structure of an electronic device according to an embodiment of the present disclosure.

Referring to FIGS. 11 and 15, in some embodiments, the antenna module 800 may further include a radio frequency (RF) circuit 462 and a match circuit 464. The RF circuit 462, the match circuit 464 and the first antenna 82 may be electrically connected sequentially such that the RF circuit 462 may feed the first antenna 82. Specifically, the RF circuit 462 may provide driving source to the match circuit 464, and the match circuit 464 may transmit the signal to the first antenna 82 such that the first antenna 82 may radiate electromagnetic signals. In this embodiment, the match circuit 464 may be disposed on the second circuit board 46, and located close to the first antenna 82. As shown in FIG. 11, in one embodiment, the RF circuit 462 may be disposed on the first circuit board 42, and the RF circuit 464 may be electrically connected to the match circuit 464 through a cable. Specifically, the cable may be independently connected between the second circuit board 46 and the first circuit board 42, i.e., the cable may be separated from the FPC 48. Alternatively, the cable may be integrated in the FPC 48 so as to avoid tangling of different wires. The RF circuit 462 may be disposed on the first circuit board 42, which may allow the reduction of the size of the second circuit board 46 as well as the movable support 30. In this way, the load of the movable support 30 may be reduced, and the movable support 30 may slide more easily. As shown in FIG. 15, in other embodiments, the RF circuit 462 may be set on the secondary circuit 46. The RF circuit 462 may be electrically connected to the match circuit 464 through the wires on the second circuit board 46. The first circuit board 42 and the second circuit board 46 may be electrically connected by the FPC 48. Thus, the conducting wires between the first circuit board 42 and the second circuit board 46 may be reduced, which may preventing tangling of wires during the movement of the movable support 30.

Referring to FIGS. 11 and 15, in some embodiments, an antenna switch 404 may further be set on the second circuit board 46. The antenna switch 404 may be electrically connected between the first antenna 82 and the RF circuit 462. The antenna switch 404 may be utilized to enable or disable the feed path from the RF circuit 462 to the first antenna 82. Specifically, the antenna switch 404 may be electrically connected between the match circuit 464 and the RF circuit 462. The first circuit board 42 may control the state of the antenna switch 404 so as to control the first antenna 82 to transmit electromagnetic signals or not. In some embodiments, when the movable support 30 moves out of the accommodating groove 50, the antenna switch 404 may be turned on. Accordingly, the RF circuit 462 may feed signals to the first antenna 82, and the first antenna 82 may transmit electromagnetic signals. When the movable support 30 is received in the accommodating groove 50, the antenna switch 404 is turned off. Accordingly, the RF circuit 462 may not transmit signals to the first antenna 82, and the first antenna 82 stops to transmit electromagnetic signals. It should be understood, in other embodiments, the state of the antenna switch 404 may not be based on the position of the movable support 30. For example, the antenna switch 404 may always be turned on no matter whether the movable support 30 is ejected out of or received in the accommodating groove 50, and the first antenna 82 may always transmit electromagnetic signals accordingly. It is known that the position of the first antenna 82 may influence the radiation effect of the first antenna 82. Thus, in some embodiments, the antenna switch 404 may further be utilized to adjust the feed path from the RF circuit 462 to the first antenna 82 so as to adjust the resonant frequency of the first antenna 82 and the frequency range of the antenna module 800. For example, when the movable support 30 moves out of the accommodating groove 50, the working environment of the first antenna 82 changes, which may generate frequency offset of the first antenna 82. In this situation, the antenna switch 404 may adjust the feed path from the RF circuit 462 to the first antenna 82 so as to adjust the radiation frequency of the first antenna 82 to the target frequency, thereby improving the radiation effect of the first antenna 82. Specifically, the match circuit 464 may include two different match circuits (e.g., a first match circuit and a second match circuit). When the movable support 30 moves out of the accommodating groove 50, the antenna switch 404 may electrically connect the RF circuit 462 to the first antenna 82 through the first match circuit. When the movable support 30 is received in the accommodating groove 50, the antenna switch 404 may electrically connect the RF circuit 462 to the first antenna 82 through the second match circuit. Thus, the frequency range of the antenna module 800 may be accordingly adjusted.

In some embodiments, the second circuit board 46 may include a reference ground. The first antenna 82 may be electrically connected to the reference ground. Specifically, the first antenna 82 may be electrically connected to the reference ground so as to form a complete electric circuit, which ensures the normal function of the first antenna 82. The reference ground may be set on the second circuit board 46, that is, both the reference ground and the first antenna 82 may be disposed on the movable support 30. The first antenna 82 may be electrically connected to the reference ground through the wires on the second circuit board 46 without introducing any other exposed conducting wires. Thus, this simple grounding method may simplify the structure of the electronic device 100.

In some embodiments, the first circuit board 42 may include a main ground thereon. The reference ground may be connected to the main ground. Components of the electronic device 100 such as the camera and the fingerprint module may all be electrically connected to the main ground. Since the reference ground is connected to the main ground, the first antenna 82 is also electrically connected to the main ground. Thus, the radiation effect of the first antenna 82 may be improved.

Figure 16:
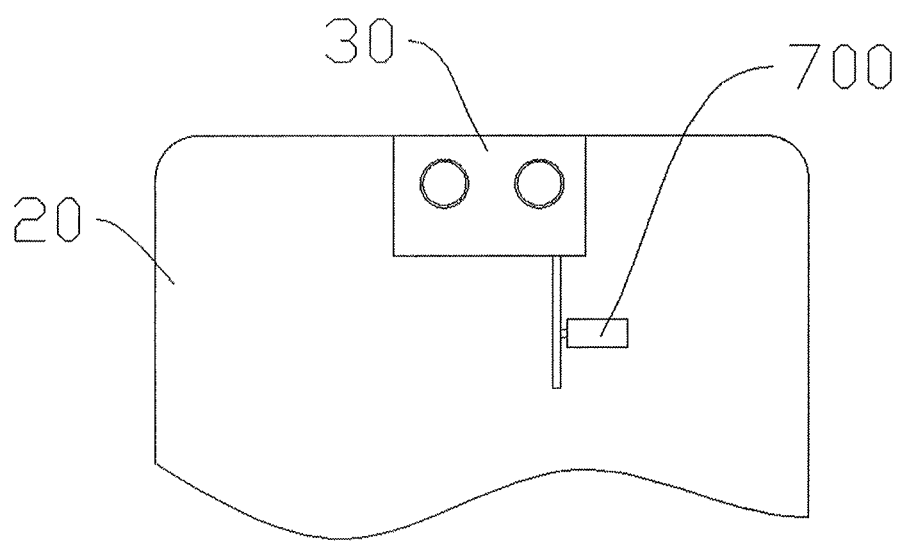
FIG. 16 shows a structural diagram of part of an electronic device according to an embodiment of the present disclosure.

Referring to FIG. 16, in some embodiments, the electronic device 100 may include a slidable mechanism 700 connected between the case 20 and the movable support 30. The movable support 30 may be slidably connected to the case 20 through the slidable mechanism 700. In other words, the implementation of the slidable mechanism 700 may realize the relative slide between the movable support 30 and the accommodating groove 50, such that the movable support 30 may move out of or retract into the accommodating groove 50. Specifically, the slidable mechanism 700 may be a movement mechanism capable of realizing linear movement, which allows the movable support 30 to slide along the length direction of the electronic device 100. In some embodiments, the slidable mechanism 700 may include a sliding block and a sliding rail, or a ball bearings and a lead screw. In some embodiments, the slidable mechanism 700 may be made of conductive material such as metal. The slidable mechanism 700 may be electrically connected between the first circuit board 42 and the second circuit board 46. Accordingly, the reference ground may be electrically connected to the main ground through the slidable mechanism 700. That is, the slidable mechanism 700 may be utilized to realize the sliding function of the movable support 30 and to electrically connect the reference ground with the main ground. Thus, the structure of the electronic device 100 may be simplified. Apparently, in other embodiments, the reference ground may be electrically connected to the main ground by conductive wires.

In some embodiments, the movable support 30 may be moved manually out of or back into the accommodating groove 50. For example, the user may push the movable support 30 to slide by finger. In other embodiments, the movable support 30 may automatically move out of or retract into the accommodating groove 50. Specifically, a driving component may be arranged inside the case 20. The driving component may drive the slidable mechanism 700 to move so as to move the movable support 30 out of or back into the accommodating groove 50. The driving component may be, for example, a driving motor. Moreover, the driving component may be electrically connected to the first circuit board 42. The user may control the driving component to operate by using the software of the operation system, so as to control the movable support 30 to move out of or retract into the accommodating groove 50. According to this embodiment, the movable support 30 may move automatically, thus the automation and intelligence of the electronic device 100 may be improved, as well as user experience.

The first antenna 82 may be disposed on the movable support 30. When the movable support 30 moves out of the accommodating groove 50, the first antenna 82 may be located at least partially out of the case 20 to transmit electromagnetic signals. Accordingly, influence of the display 10 and other components on the first antenna 82 may be reduced, thereby improving the radiation effect of the radiator. When the movable support 30 is received in the accommodating groove 50, the first antenna 82 may be hidden inside the case 20. Thus, the portability of the electronic device 100 may be improved. Furthermore, the first antenna 82 does not occupy the display area of the display 10, which may increase screen-to-body ratio, thereby improving user experience.

Referring to FIGS. 11 and 13, in some embodiments, the side frame 22a of the middle frame 22 may be made of metal, such as aluminum and aluminum alloy. The side frame 22a may include several frame-bodies. The frame-bodies may be spaced apart from each other by several spacing portions, and at least one frame-body may act as a second antenna. That is, the spacing portions may divide the side frame 22a into several frame-bodies capable of being used as antenna. For example, as shown in FIG. 11, the frame-bodies may include a second antenna 84, a third antenna 86 and a fourth antenna 88. The second antenna 84 and the third antenna 86 may be located at one end of the side frame 22a. The second antenna 84 and the third antenna 86 may be respectively located at two sides of the opening 54. The fourth antenna 88 may be located between the second antenna 84 and the third antenna 86. Specifically, the second antenna 84, the third antenna 86 and the fourth antenna 88 may each be a part of the side frame 22a. The second antenna 84 and the third antenna 86 may be the top sub-frame 226, or the combination of the top sub-frame 226 and part of the side sub-frames 224. The fourth antenna 88 may be the side sub-frames 224, or the combination of the bottom sub-frame 226 and part of the side sub-frames 224. In some embodiments, the side frame 22a may be rectangular. The spacing portions of the side frame 22a may include a first spacing portion P1 and a second spacing portion P2. Each spacing portion may be filled with non-metal material such that the frame-bodies on two sides of the spacing portion may be connected. The first spacing portion P1 may be located at the left side sub-frame 224 of the side frame 22a. The part of the left side sub-frame 224 above the first spacing portion P1 and the top sub-frame 226 may constitute the second antenna 84. The second spacing portion P2 may be located at the right side sub-frame 224 of the side frame 22a. The part of the right side sub-frame 224 above the second spacing portion P2 and the top sub-frame 226 may constitute the third antenna 86. That is, the second antenna 84 and the third antenna 86 may be symmetrically disposed on two opposite sides of the opening 54 of the side frame 22a. The part of the side sub-frames 224 below the first spacing portion P1 and the second spacing portion P2 and the bottom sub-frame 22 of which the two ends are connected to the side sub-frames may cooperatively constitute the fourth antenna 88. In some embodiments, the fourth antenna 88 may further be divided into several antennas. The second antenna 84, the third antenna 86 and the fourth antenna 88 may all be electrically connected to the first circuit board 42. The first circuit board 42 may be utilized to control the second antenna 84, the third antenna 86 and the fourth antenna 88 to transmit electromagnetic signals. Specifically, the RF circuit of the first circuit board 42 may feed the second antenna 84, the third antenna 86 and the fourth antenna 88. In some embodiments, the second antenna 84, the third antenna 86 and the fourth antenna 88 may operate independently. Furthermore, the second antenna 84, the third antenna 86 and the fourth antenna 88 may be utilized to transmit one of WIFI signals, LTE signals, millimeter signals, GPS signals, GSM signals or Bluetooth signals.

In some embodiments, an antenna switch may be arranged between the antennas and the RF circuit 462. The antenna switch may be utilized to adjust the feed path from the RF circuit 462 to the antennas so as to adjust the resonant frequencies of the antennas. When the movable support 30 moves out of the accommodating groove 50, the radiation environment of the second antenna 84 and the third antenna 86 may be changed, which may cause frequency offset of the second antenna 84 and the third antenna 86. The antenna switch 404 may be utilized to adjust the feed path from the RF circuit 462 to the second antenna 84 and the third antenna so as to adjust the radiation frequency of the second antenna 84 and the third antenna 86 to the target frequency, thereby improving the radiation effect.

In some embodiments, the states of the first antenna 82, the second antenna 84, the third antenna 86 and the fourth antenna 88 may be changed. For example, when the movable support 30 moves out of the accommodating groove 50, the first antenna 82, the second antenna 84 and the third antenna 86 may transmit electromagnetic signal while the fourth antenna 88 stops to transmit electromagnetic signals. When the movable support 30 is received in the accommodating groove 50, the first antenna 82, the second antenna 84 and the third antenna 86 may stop to transmit electromagnetic signals while the fourth antenna 88 transmits electromagnetic signals. By changing the states of the first antenna 82, the second antenna 84, the third antenna 86 and the fourth antenna 88, different radiation effects may be obtained for corresponding design and environment.

The states of at least two of the first antenna 82, the second antenna 84, the third antenna 86 and the fourth antenna 88 may be changed under the following exemplary situations.

In one embodiment, the first antenna 82 and the fourth antenna 88 may both operate as radiator for transmitting WIFI signals. When the user uses the electronic device 100 in a Portrait mode to watch video (or to perform other operation), the movable support 30 may moves out such that the first antenna 82 may be located outside the accommodating groove 50 which improves the radiation effect. When the user uses the electronic device 100 in a Landscape mode to play games (or to perform other operation), the movable support 30 may move back into the accommodating groove 50. In this circumstance, the electronic device 100 may transmit signals through the fourth antenna 88, which prevents the movable support 30 from influencing the user's operation.

In one embodiment, the first antenna 82 and the fourth antenna 88 may both operate as radiator for transmitting GSM signals. In an initial state, the movable support 30 may be received in the accommodating groove 50. When the user makes or receives a phone call, the fourth antenna 88 may transmit GSM signals to realize the calling function. If the radiation mode of the fourth antenna 88 is interfered for some reason, the movable support 30 may move out automatically such that the first antenna 82 may be located outside the accommodating groove 50. The electronic device 100 may be switched to transmit GSM signals through the first antenna 82 so as to improve the radiation effect of the first antenna 82, thereby improving connection quality. In this embodiment, the signal strength of the fourth antenna 88 or the standing wave ratio (SWR) of signal may be detected for determining whether the radiation mode of the fourth antenna 88 is interfered.

In one embodiment, the first antenna 82 and the fourth antenna 88 may both operate as radiator for transmitting GPS signals. In an initial state, the movable support 30 may be received in the accommodating groove 50. When the user enables a software such as electronic map or navigation application of the electronic device 100, the fourth antenna 88 may transmit GPS signals for positioning. When the user enters some place where the signal is weak, e.g., a tunnel, the movable support 30 may move out automatically such that the first antenna 82 may be located outside the accommodating groove 50. Thus, the radiation effect of the first antenna 82 may be improved, thereby improving positioning precision.

Figure 17:
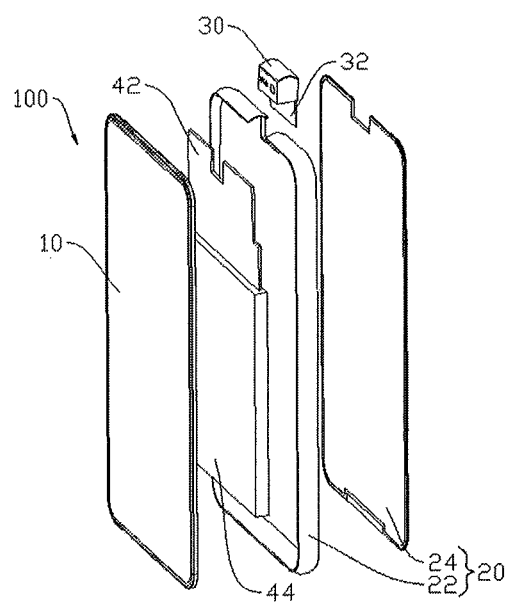
FIG. 17 is an exploded view of an electronic device according to an embodiment of the present disclosure.
Figure 18:
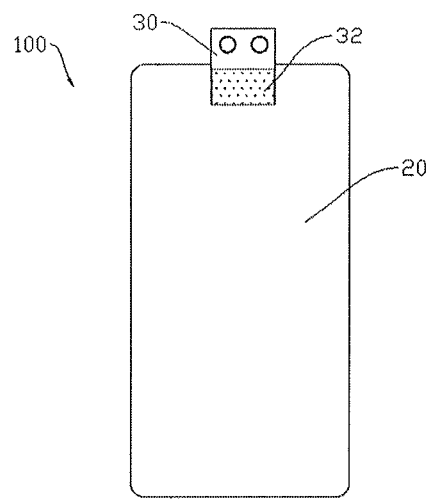
FIG. 18 illustrates a back view of an electronic device according to an embodiment of the present disclosure.
Figure 19:
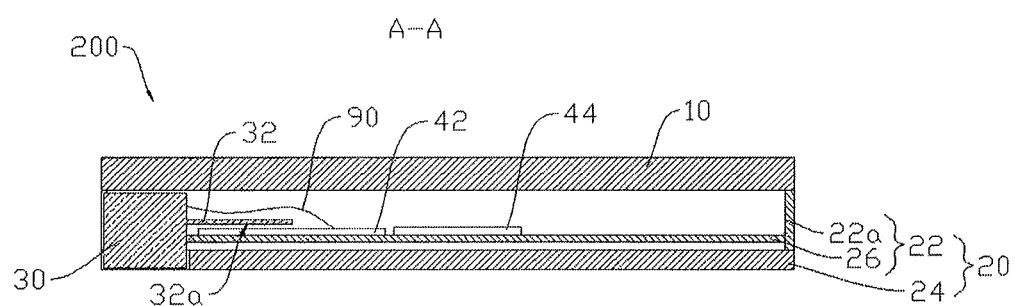
FIGS. 19 and 20 each illustrates a section view of the electronic device of FIG. 4 according to an embodiment of the present disclosure.
Figure 20:
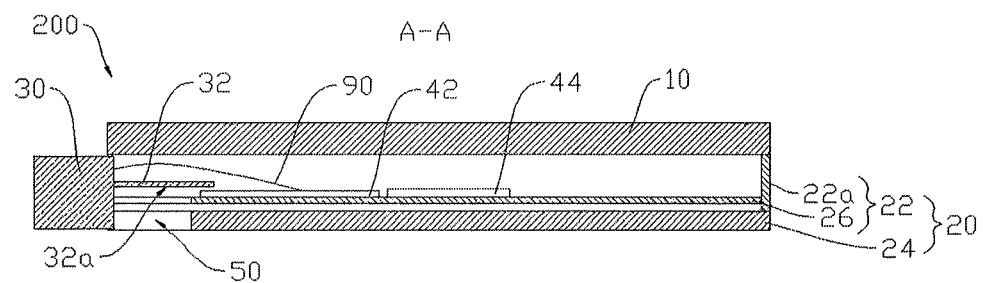

Referring to FIG. 17, the structure of the electronic device 200 of this embodiment may be similar to the electronic device 100 as described above. However, the movable support 30 may include a tongue portion 32 set on one end of the movable support 30. Optionally, the tongue portion 32 may be integrally formed with the movable support 30. The tongue portion 32 may be located on the side of the back case 24 close to the display 10. Specifically, the tongue portion 32 may be located between the support plate 26 and the display 10. It should be understood, the thickness of the tongue portion 32 may be less than that of the movable support 30, such that the tongue portion 32 may be received in the case 20 when the movable support 30 is received in the accommodating groove 50. Referring also to FIGS. 18 to 20, the tongue portion 32 may include an appearance surface 32a opposite to the display 10. The appearance surface 32a may be polished and coated with a film during fabrication so as to improve its appearance. In some embodiments, the appearance surface 32a may have similar appearance characters as the back cover 24. Thus, when the appearance surface 32a is exposed, it may be in accordance with the appearance of the back cover 24, thereby improving the appearance of the electronic device 200.

Referring to FIG. 19, when the movable support 30 is received in the accommodating groove 50, the tongue portion 32 may be received inside the case 20. The first circuit board 42 and the battery 44 may be installed on one side of the support plate 26 which faces the display 10, and the tongue portion 32 may be located between the first circuit board 42, the battery 44 and the display 10. Thus, the tongue portion 32 may be well hidden inside the case 20, and will not occupy too much room.

Referring to FIG. 20, when the movable support 30 moves out of the accommodating groove 50, the tongue portion 32 may be received at least partially in the accommodating groove 50, and thus insulate the inside from the outside of the case 20. The first circuit board 42 may be electrically connected to the first antenna 82 through a second wire 90. The second wire 90 may be located at a side of the tongue portion 32 close to the display, and be electrically connected to the first antenna 82. The second wire 90 may be received in the space cooperatively defined by the tongue portion 32, the back cover 24 and the display 10. Specifically, the second wire 90 may include the FPC 48. In one embodiment, the second wire 90 may further include a cable 410. On one hand, the appearance surface 32a of the tongue portion 32 may improve the appearance of the back surface of the electronic device 200. On the other hand, the tongue portion 32 may fill the opening of the accommodating groove 50 which is exposed after the movable support 30 moves out. Thus, the inner structure of the electronic device 200 may be covered, and be protected from water and dust. Furthermore, the second wire 90 may be hidden in the space cooperatively defined by the tongue portion 32, the back cover 24 and the display 10. Thus, the second wire 90 is not exposed and is protected from being broken, which improves the reliability of the electronic device 200.

Referring to FIGS. 19 and 20, in some embodiments, the size of the tongue portion 32 along the sliding direction of the movable support 30 may be no less than the sliding stroke of the movable support 30. As shown in FIG. 20, even the movable support 30 is completely ejected out of the accommodating groove 50, the tongue portion 32 may still cover the opening of the accommodating groove 50, thereby keeping the second wire 90 hidden and preventing water and dust.

Figure 21:
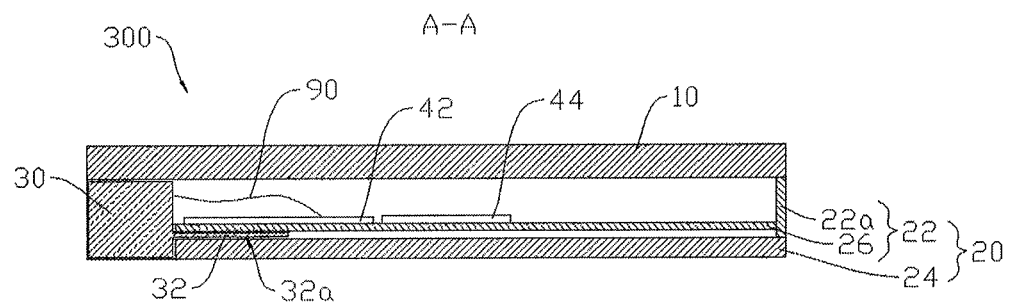
FIGS. 21 and 22 each illustrates a section view of the electronic device of FIG. 4 according to another embodiment of the present disclosure.
Figure 22:
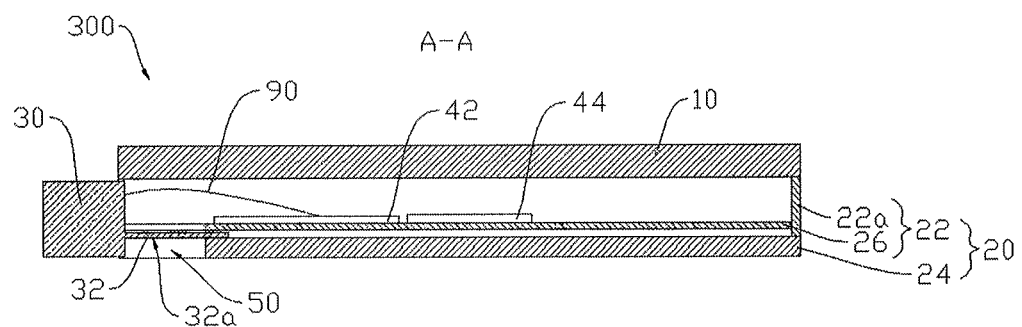

Referring to FIGS. 21 and 22, the electronic device 300 of this embodiment is similar to the electronic device 100 as described above. However, a tongue portion 32 may be set on one end of the movable support 30. In some embodiments, the tongue portion 32 may be integrally formed with the movable support 30. Specifically, the tongue portion 32 may be located between the support 26 and the back cover 24. Furthermore, the tongue portion 32 may include an appearance surface 32a opposite to the display 10. The appearance surface 32a may be polished and coated with a film during fabrication so as to improve its appearance. In some embodiments, the appearance surface 32a may have similar appearance characters as the surface of the back cover 24. Thus, when the appearance surface 32a is exposed, it may be in accordance with the appearance of the back cover 24, which improves the appearance of the back surface of the electronic device 300.

Referring to FIG. 21, when the movable support 30 is received in the accommodating groove 50, the tongue portion 32 may be received inside the case 20. The first circuit board 42 and the battery 44 may be installed on one side of the support plate 26 which faces the display 10, and the tongue portion 32 may be located between the support plate 26 and the back cover 24. Thus, the tongue portion 32 may be well hidden inside the case 20, and will not occupy too much room.

Referring to FIG. 22, when the movable support 30 moves out of the accommodating groove 50, the tongue portion 32 may be received at least partially in the accommodating groove 50, and thus insulate the inside from the outside of the case 20. The first circuit board 42 may be electrically connected to the first antenna 82 through a second wire 90. The second wire 90 may be located at a side of the tongue portion 32 close to the display, and be electrically connected to the first antenna 82. The second wire 90 may be received in the space cooperatively defined by the tongue portion 32, the back cover 24 and the display 10. On one hand, the appearance surface 32a of the tongue portion 32 may improve the appearance of the back surface of the electronic device 300. On the other hand, the tongue portion 32 may fill the opening of the accommodating groove 50 which is exposed after the movable support 30 moves out. Thus, the inner structure of the electronic device 300 may be covered, and be protected from water and dust. Furthermore, the second wire 90 may be hidden in the space cooperatively defined by the tongue portion 32, the back cover 24 and the display 10. Thus, the second wire 90 is not exposed and is protected from being broken, which improves the reliability of the electronic device 300.

Figure 23:
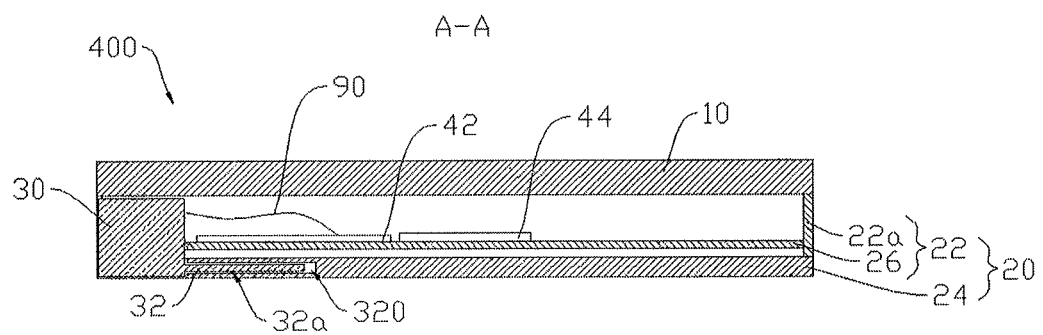
FIGS. 23 and 24 each illustrates a section view of the electronic device of FIG. 4 according to yet another embodiment of the present disclosure.
Figure 24:
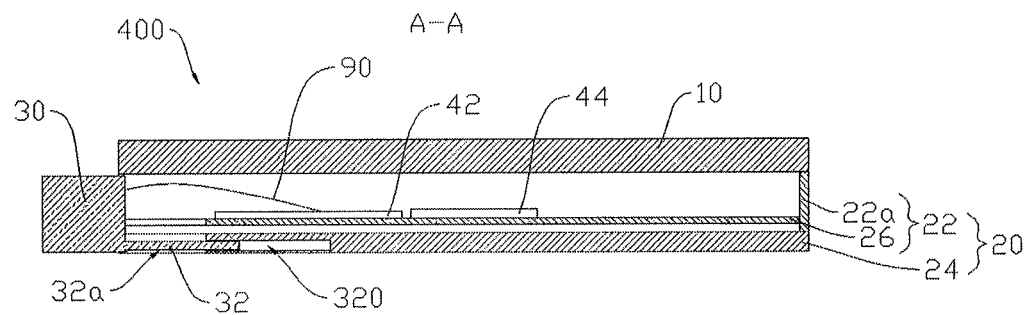

Referring to FIGS. 23 and 24, in this embodiment, the electronic device 400 may be similar to the electronic device 100 as described above. However, a tongue portion 32 may be set on one end of the movable support 30. One end of the back cover 24 may define an inserting slot 320 corresponding to the tongue portion 32. The tongue portion 32 may be at least partially located in the inserting slot 320. When the movable support 30 is received in the accommodating groove 50, the tongue portion 32 may be received in the back cover 24. When the movable support 30 moves out of the accommodating groove 50, the tongue portion 32 may be at least partially located in the accommodating groove 50, and may insulate the inside from the outside of the case 20. Furthermore, the tongue portion 32 may include an appearance surface 32a opposite to the display 10. The appearance surface 32a may be polished and coated with a film during fabrication so as to improve its appearance. In some embodiments, the appearance surface 32a may have similar appearance characters as the surface of the back cover 24. Thus, when the appearance surface 32a is exposed, it may be in accordance with the appearance of the back cover 24, which improves the appearance of the back surface of the electronic device 400.

As shown in FIG. 23, when the movable support 30 is received in the accommodating groove 50, the tongue portion 32 may be received in the inserting slot 320 of the back cover 24. Thus, the tongue portion 32 may be well hidden inside the case 20, and will not occupy too much room.

Referring to FIG. 24, when the movable support 30 moves out of the accommodating groove 50, at least part of the tongue portion 32 may move out of the inserting slot 320. This part of the tongue portion 32 may be located in the accommodating groove 50, and may insulate the inside from the outside of the case 20. The first circuit board 42 may be electrically connected to the first antenna 82 through a second wire 90. The second wire 90 may be located at a side of the tongue portion 32 close to the display, and be electrically connected to the first antenna 82. The second wire 90 may be received in the space cooperatively defined by the tongue portion 32, the back cover 24 and the display 10. On one hand, the appearance surface 32a of the tongue portion 32 may improve the appearance of the back surface of the electronic device 400. On the other hand, the tongue portion 32 may fill the opening of the accommodating groove 50 which is exposed after the movable support 30 moves out. Thus, the inner structure of the electronic device 300 may be covered, and be protected from water and dust. Furthermore, the second wire 90 may be hidden in the space cooperatively defined by the tongue portion 32, the back cover 24 and the display 10. Thus, the second wire 90 is not exposed and is protected from being broken, which improves the reliability of the electronic device 400.

The first antenna 82 may be set on the movable support 30. When the movable support 30 moves out of the accommodating groove 50, the first antenna 82 may be located outside the case 20 for transmitting electromagnetic signals. Thus, influence of the display 10 and other devices on the first antenna 82 may be reduced, thereby improving the radiation effect of the first antenna 82. When the movable support 30 is received in the accommodating groove 50, the first antenna 82 may be hidden inside the case 20, such that the portability of the electronic device 400 may be improved. Furthermore, the first antenna 82 does not occupy the display area of the display 10, which may allow the increase of screen-to-body ratio, thus improving user experience.

Figure 25:
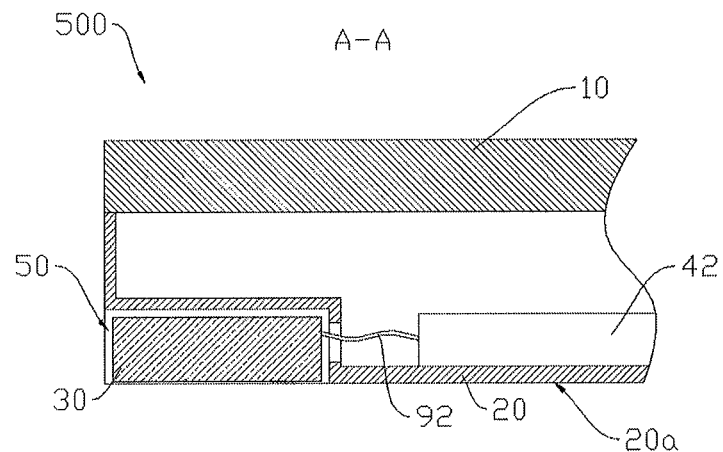
FIGS. 25 and 26 each illustrates a section view of the electronic device of FIG. 4 according to another embodiment of the present disclosure.
Figure 26:
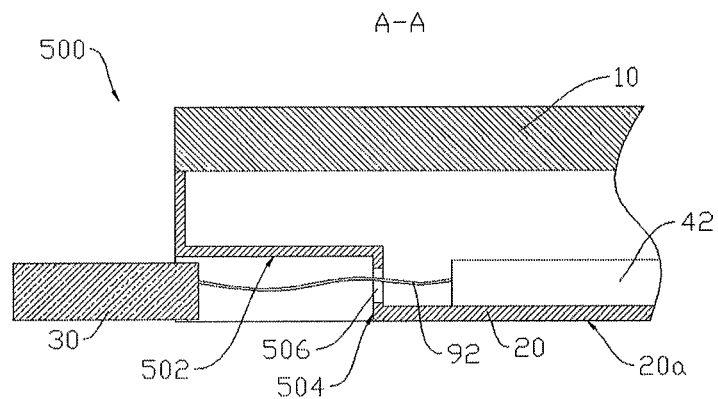

Referring to FIGS. 25 and 26, in this embodiment, the electronic device 500 may be similar to the electronic device 100 as described above. However, the case 20 may include an outer surface 20a, and the accommodating groove 50 may be formed on the outer surface 20a. The accommodating groove 50 may include a groove bottom 502 and a groove wall 504 which connects the groove bottom 502 and the outer surface 20a. The groove bottom 502 may insulate the movable support 30 from the inner structure of the case 20. In other words, those devices inside the case 20 may be insulated from the outside of the case 20 by the groove bottom 502. Thus, after the movable support 30 moves out of the accommodating groove 50, the devices inside the electronic device 500 will not be exposed. In some embodiments, a guiding rail may be set on the groove bottom 502 or the groove wall 504, and the movable support 30 may slide along the guiding rail.

In some embodiments, the first circuit board 42 may be received in the case 20. The first circuit board may be electrically connected to the first antenna 82 through a transmission wire, e.g., the first wire 92, so as to provide driving signals to the first antenna 82. For example, the first wire 92 may at least include the FPC 48. Optionally, the first wire 92 may further include a cable 410. The groove bottom 502 or the groove wall 504 may define a through hole 506 through which the first wire 92 may passes. In some embodiments, the RF circuit 462 may be set on the first circuit board 42 while the match circuit 464 may be set on the movable support 30. The RF circuit 462 and the match circuit 464 may be connected by the cable 410. The cable 410 may pass through the through hole 506 on the groove wall 504 to be connected between the match circuit 464 and the RF circuit 462.

In this embodiment, the first wire 92 may be capable of stretching or contracting in accordance with the movement of the first antenna 82. That is, the end of the first wire 92 connected to the first antenna 82 may move linearly so as to adapt to the movement of the first antenna 82. It is possible that the first wire 92 is entangled during movement, shifts from its original movement track, or interferes adjacent devices. Thus, a guiding component may be set inside the case 20. The guiding component may be utilized to limit the movement of the first wire 92 so as to guide the first wire 92. The first wire 92 may follow its designed movement under the limitation of the guiding component, and will not probably be entangled.

Figure 31:
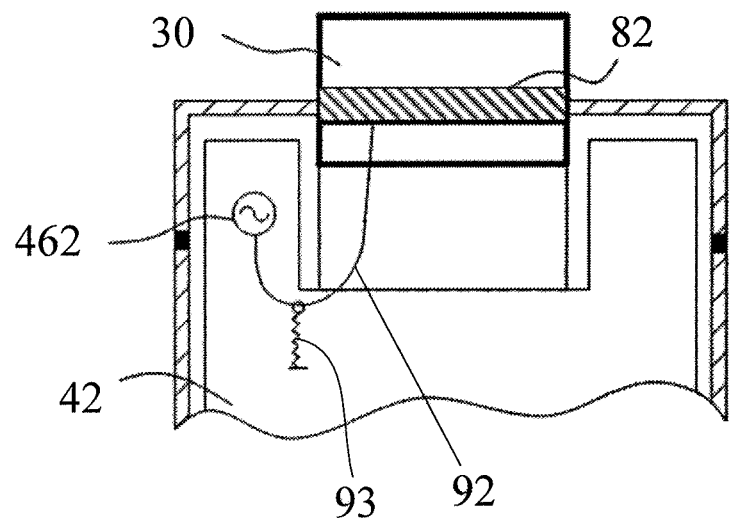
FIG. 31 shows an exemplary configuration of the guiding component for the first wire.

As shown in FIG. 31, in some embodiments, the guiding component may be an elastic component 93. The elastic component 93 is elastic and capable of stretching and contracting, including but not limited to spring or other elastic device capable of enduring axial tension. One end of the elastic component 93 may connect to the case 20, and the other end of the elastic component 93 may connect to the first wire 92. The elastic component 93 may deform when the first wire 92 is stretching or contracting, and apply traction force on the first wire 92 so as to limit the movement of the first wire 92.

Figure 32:
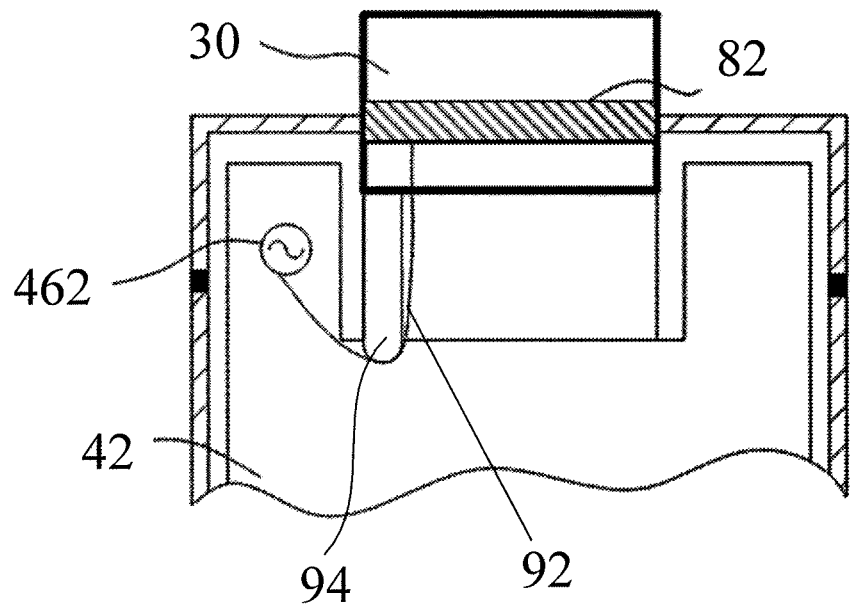
FIG. 32 shows another exemplary configuration of the guiding component for the first wire.

As shown in FIG. 32, in other embodiments, the guiding component may be a guiding rod 94 moving along with the movable support 13. The guiding rod 94 may include a first end and a second end opposite to each other. The first end of the guiding rod 94 may be connected with the movable support 13. The second end of the guiding rod 94 may be in contact with the first wire 92 such that the first wire 92 may slide along the surface of the second end of the guiding rod 94. Specifically, the first wire 92 may extend around the second end of the guiding rod 94. One end of the first wire 92 may be connected to the first antenna 82, and the other end of the first wire 92 may be connected to the RF circuit 462. When the first wire 92 stretches or contracts in accordance with the movement of the first antenna 82, the first wire 92 and the second end of the guiding rod 94 compose a sliding pair, and thus the first wire 92 may slide along the surface of the second end of the guiding rod 94.

Figure 33:
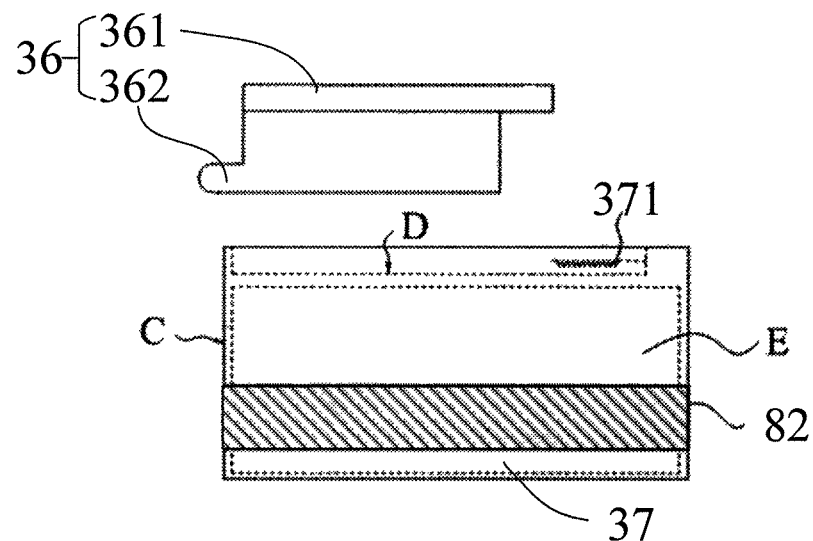
FIG. 33 shows an exploded view of a movable support according to an embodiment of the present disclosure.
Figure 34:
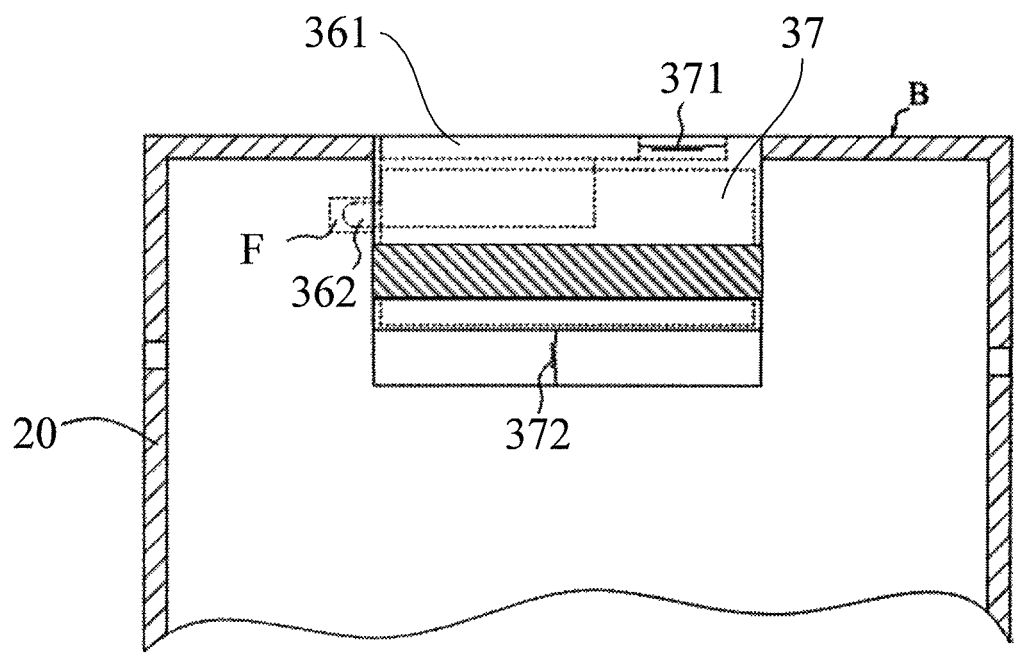
FIG. 34 shows an electronic device installed with the movable support of FIG. 33.

Referring to FIGS. 33 and 34, in some embodiments, the movable support 30 may include a support body 37 and a lock component 36 slidably connected together. The support body 37 may have a hollow structure, and define an accommodating cavity E. The accommodating cavity E may have an opening C in the cavity wall. The lock component 36 may be partially received in the accommodating cavity E of the support body 37. The support body 37 may have a matching surface D facing outwards the case. The matching surface D may be the outer surface of the cavity wall of the accommodating cavity E. The matching surface D may be configured to match the lock component 36, and the lock component 36 is capable of sliding along the matching surface D. The lock component 36 may include a toggle portion 361 and a latch portion 362 connected together. The latch portion 362 may be received in the accommodating cavity E of the support body 37, and be movably connected with the support body 37. The toggle portion 361 may be assembled on the matching surface D, and is capable of sliding along the matching surface D. The user may move the toggle portion 361, and use the toggle portion 361 to drive the latch portion 362 to stretch out of or retract back into the support body 37. The first antenna 82 may be disposed either on the support body 37 or on the lock component 36.

As shown in FIGS. 33 and 34, in this embodiment, the case 20 may define a latch slot F corresponding to the location of the latch portion 362. The latch portion 362 may be inserted in the latch slot F when stretching out of the support body 37 such that the movable support 30 may be locked with the case. The latch portion 362 may be separated from (or ejected out of) the latch slot F when retracting into the support body 37 so as to allow the movable support 30 to move with respect to the case 20. Therefore, the movable support 30 may be locked or released by moving the toggle portion 361 and the latch portion 362. For example, when it is required to take out the movable support 30, the user may move the toggle portion 361 to pull the latch portion 362 into the support body 37. In this situation, the movable support 30 may be unlocked. When the movable support 30 is completed retracted, the user may move the toggle portion 361 towards an opposite direction to push out the latch portion 362 from the support body 37 and insert it into the latch slot F. In this situation, the movable support 30 may be locked.

Referring to FIGS. 33 and 34, in some embodiments, an elastic support 372 may be disposed inside the case 20. An end of the elastic support 372 may be connected with the support body 37, and the other end of the elastic support 372 may be fixed to the case 20 directly or indirectly. The elastic support 372 may be used to push the movable support 30 out of the case 20 when the latch portion 362 is separated from the latch slot F. The elastic support 372 may include, but is not limited to, a spring. Therefore, in this embodiment, the movable support 30 may be pushed out by elastic force generated by the elastic support 372 when unlocked. Then, the elastic support 372 may continue to support the movable support 30. When it is required to retract the movable support 30, the user may push the movable support 30 so as to make it to move back. When the movable support 30 arrives at the extreme position, the user may move the toggle portion 361 to lock the movable support 30. In other embodiments, the elastic support 372 may be omitted. Instead, the movable support 30 may be pulled out by the user's hand, and be fixed by friction between the movable support 30 and the inner wall of the accommodating hole of the side surface B.

Referring to FIGS. 33 and 34, in some embodiments, an elastic resetting component 371 may be connected between the lock component 36 and the support body 37. The elastic resetting component 371 may be utilized to apply elastic force on the lock component 36 so as to restore the lock component 36 to its original position. The original position may refer to the position where the lock component 36 arrives when it stretches out of the support body 37. When the user move the toggle portion 361, the latch portion 362 may leave the original position. When the user release the toggle portion 361, the latch portion 362 may be restored to the original position. The elastic resetting component 371 may include, but is not limited to, a spring. The elastic resetting component 371 may be connected to either the toggle portion 361 or the latch portion 362. The implementation of the elastic resetting component 371 may automatically restore the lock component 36 to its original position so as to automatically lock the movable support 30. With the elastic resetting component 371, it is no longer necessary to lock the movable support 30 by moving the toggle portion 361 manually.

The first antenna 82 may be arranged on the movable support 30. When the movable support 30 moves out of the accommodating groove 50, the first antenna 82 may be located outside the case 20 for transmitting electromagnetic signals. Accordingly, influence of the display 10 and other devices on the first antenna 82 may be reduced, thereby improving the radiation effect of the first antenna 82. When the movable support 30 is received in the accommodating groove 50, the first antenna 82 may be hidden in the case 20, such that the portability of the electronic device 500 may be improved. Furthermore, the arrangement of the first antenna 82 does not occupy the display area of the display 10, which allows the increase of screen-to-body ratio. Thus, user experience may be improved.

Figure 27:
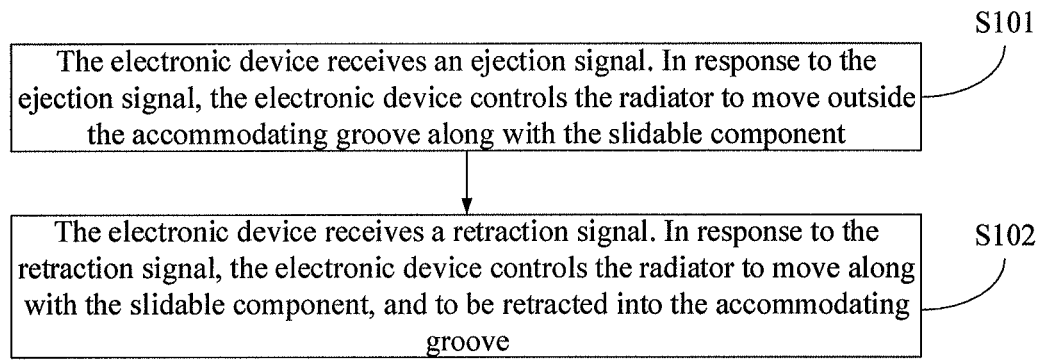
FIG. 27 shows a flow chart of a method for controlling an electronic device according to an embodiment of the present disclosure.

Referring to FIG. 27, the present disclosure also provides a method for controlling an electronic device. The method may be utilized to control the antenna of the electronic device provided in the present disclosure to operate. The electronic device may refer to any electronic device described in above embodiments. Referring to FIG. 1, the electronic device may include a display 10, a case 20 and a movable support 30. The display 10 may be set on the case 20 and cover the case 20. One end of the case 20 may define an accommodating groove 50 which communicates the inside and the outside of the case 20. The movable support 30 may be slidably connected to the case 20. The movable support 30 is capable of moving out of or retracting into the accommodating groove 50. A first antenna 82 of an antenna module 800 may be set on the movable support 30. Furthermore, the first antenna 82 may be a radiator for any one of WIFI antenna, LTE antenna, millimeter wave antenna, GPS antenna, GSM antenna or Bluetooth antenna. The method may include operations described in the following blocks.

S101: The electronic device receives an ejection signal. In response to the ejection signal, the electronic device controls the first antenna 82 to move away from the case 20 along with the movable support 30. The first antenna 82 is ejected outside the accommodating groove, as shown in FIG. 12.

S102: The electronic device receives a retraction signal. In response to the retraction signal, the electronic device controls the first antenna 82 to move towards the case 20 along with the movable support 30. The first antenna 82 is retracted into the accommodating groove, as shown in FIG. 11.

The first antenna 82 may be arranged on the movable support 30. When the movable support 30 moves out of the accommodating groove 50, the first antenna 82 may be located outside the case 20 for transmitting electromagnetic signals. Accordingly, influence of the display 10 and other devices on the first antenna 82 may be reduced, thereby improving the radiation effect of the first antenna 82. When the movable support 30 is received in the accommodating groove 50, the first antenna 82 may be hidden in the case 20, such that the portability of the electronic device 500 may be improved. Furthermore, the arrangement of the first antenna 82 does not occupy the display area of the display 10, which allows the increase of screen-to-body ratio. Thus, user experience may be improved.

In some embodiments, the movable support 30 may be driven by a driving mechanism or be controlled manually by a user. Different exemplary application scenarios of the movable support 30 includes, but are not limited to, the following situations.

In one embodiment, the first antenna 82 may be a radiator for radiating GSM signals. In an initial state, the movable support 30 is received in the accommodating groove 50. When the user makes or receives a phone call, the movable support 30 may move out automatically. In this way, the first antenna 82 is ejected outside the accommodating groove 50 such that the first antenna 82 may radiate GSM signals more effectively, thereby improving connection quality.

In one embodiment, the first antenna 82 may be a radiator for radiating Bluetooth signals. In an initial state, the movable support 30 is received in the accommodating groove 50. When the user enables the Bluetooth function of the electronic device 100, or when the electronic device 100 has matched another Bluetooth device and is about to transmit data, the movable support 30 may move out automatically. Since the first antenna 82 is located outside the accommodating groove 50, the effect that the first antenna 82 radiates Bluetooth signals as well as the data transmission quality may be improved.

In one embodiment, the first antenna 82 may be a radiator for radiating GPS signals. In an initial state, the movable support 30 is received in the accommodating groove 50. When the user enables an application such as electronic map or navigation application of the electronic device 100, the movable support 30 may move out automatically. Since the first antenna 82 is located outside the accommodating groove 50, the effect that the first antenna 82 radiates GPS signals as well as the location precision may be improved.

Referring to FIGS. 11 and 12, the electronic device may further include a RF circuit 462 and an antenna switch 404. The antenna switch 404 may be connected between the RF circuit 462 and the first antenna 82, and be disposed on the movable support 30. The antenna switch 404 may be electrically connected between the match circuit 464 and the RF circuit 462. The first circuit board 42 may control the state of the antenna switch 404 so as to control the first antenna 82 to transmit electromagnetic signals or not. In some embodiments, when the movable support 30 moves out of the accommodating groove 50, the antenna switch 404 may be turned on. Accordingly, the RF circuit 462 may transmit signals to the first antenna 82, and the first antenna 82 may transmit electromagnetic signals. When the movable support 30 is received in the accommodating groove 50, the antenna switch 404 is turned off. Accordingly, the RF circuit 462 may not transmit signals to the first antenna 82, and the first antenna 82 stops to transmit electromagnetic signals.

The case 20 may include a middle frame 22 and a back cover 24. The back cover 24 and the display 10 may be respectively disposed on two opposite sides of the middle frame 22, as shown in FIGS. 11 and 13. In some embodiments, the side frame 22a of the middle frame 22 may be made of metal, such as aluminum and aluminum alloy. The side frame 22a may include several spacing portions. The spacing portions may divide the side frame 22a into several body-frames. At least one of the body-frames may act as antenna. For example, as shown in FIG. 11, the body-frames may include a second antenna 84, a third antenna 86 and a fourth antenna 88. The second antenna 84 and the third antenna 86 may be located at one end of the side frame 22a. The second antenna 84 and the third antenna 86 may be respectively located at two sides of the opening 54. The fourth antenna 88 may be located between the second antenna 84 and the third antenna 86. Specifically, the second antenna 84, the third antenna 86 and the fourth antenna 88 may each be a part of the side frame 22a. The second antenna 84 and the third antenna 86 may be the top sub-frame 226, or the combination of the top sub-frame 226 and part of the side sub-frames 224. The fourth antenna 88 may be the side sub-frames 224, or the combination of the bottom sub-frame 226 and part of the side sub-frames 224. In some embodiments, the side frame 22a may be rectangular. The spacing portions of the side frame 22a may include a first spacing portion P1 and a second spacing portion P2. Each spacing portion may be filled with non-metal material such that the sub-frames on two sides of the spacing portion may be connected. The first spacing portion P1 may be located at the left side sub-frame 224 of the side frame 22a. The part of the left side sub-frame 224 above the first spacing portion P1 and the top sub-frame 226 may constitute the second antenna 84. The second spacing portion P2 may be located at the right side sub-frame 224 of the side frame 22a. The part of the right side sub-frame 224 above the second spacing portion P2 and the top sub-frame 226 may constitute the third antenna 86. That is, the second antenna 84 and the third antenna 86 may be symmetrically disposed on two opposite sides of the opening 54 of the side frame 22a. The part of the side sub-frames 224 below the first spacing portion P1 and the second spacing portion P2 and the bottom sub-frame 22 of which the two ends are connected to the side sub-frames may cooperatively constitute the fourth antenna 88. In some embodiments, the fourth antenna 88 may further be divided into several antennas. The second antenna 84, the third antenna 86 and the fourth antenna 88 may all be electrically connected to the first circuit board 42. The first circuit board 42 may be utilized to control the second antenna 84, the third antenna 86 and the fourth antenna 88 to transmit electromagnetic signals. Specifically, the RF circuit of the first circuit board 42 may feed the second antenna 84, the third antenna 86 and the fourth antenna 88. In some embodiments, the second antenna 84, the third antenna 86 and the fourth antenna 88 may operate independently. Furthermore, the second antenna 84, the third antenna 86 and the fourth antenna 88 may be utilized to transmit one of WIFI signals, LTE signals, millimeter signals, GPS signals, GSM signals or Bluetooth signals.

In some embodiments, the states of the first antenna 82, the second antenna 84, the third antenna 86 and the fourth antenna 88 may be changed. For example, when the movable support 30 moves out of the accommodating groove 50, the first antenna 82, the second antenna 84 and the third antenna 86 may transmit electromagnetic signal while the fourth antenna 88 stops to transmit electromagnetic signals. When the movable support 30 is received in the accommodating groove 50, the first antenna 82, the second antenna 84 and the third antenna 86 may stop to transmit electromagnetic signals while the fourth antenna 88 transmits electromagnetic signals. By changing the states of the first antenna 82, the second antenna 84, the third antenna 86 and the fourth antenna 88, different radiation effects may be obtained for corresponding design and environment.

The states of at least two of the first antenna 82, the second antenna 84, the third antenna 86 and the fourth antenna 88 may be changed under the following exemplary situations.

In one embodiment, the first antenna 82 and the fourth antenna 88 may both operate as radiator for transmitting WIFI signals. When the user uses the electronic device 100 in a Portrait mode to watch video (or to perform other operation), the movable support 30 may moves out such that the first antenna 82 may be located outside the accommodating groove 50 which improves the radiation effect. When the user uses the electronic device 100 in a Landscape mode to play games (or to perform other operation), the movable support 30 may move back into the accommodating groove 50. In this circumstance, the electronic device 100 may transmit signals through the fourth antenna 88, which prevents the movable support 30 from influencing the user's operation.

In one embodiment, the first antenna 82 and the fourth antenna 88 may both operate as radiator for transmitting GSM signals. In an initial state, the movable support 30 may be received in the accommodating groove 50. When the user makes or receives a phone call, the fourth antenna 88 may transmit GSM signals to realize the calling function. If the radiation mode of the fourth antenna 88 is interfered for some reason, the movable support 30 may move out automatically such that the first antenna 82 may be located outside the accommodating groove 50. The electronic device 100 may be switched to transmit GSM signals through the first antenna 82 so as to improve the radiation effect of the first antenna 82, thereby improving connection quality. In this embodiment, the signal strength of the fourth antenna 88 or the standing wave ratio (SWR) of signal may be detected for determining whether the radiation mode of the fourth antenna 88 is interfered.

In one embodiment, the first antenna 82 and the fourth antenna 88 may both operate as radiator for transmitting GPS signals. In an initial state, the movable support 30 may be received in the accommodating groove 50. When the user enables a software such as electronic map or navigation application of the electronic device 100, the fourth antenna 88 may transmit GPS signals for positioning. When the user enters some place where the signal is weak, e.g., a tunnel, the movable support 30 may move out automatically such that the first antenna 82 may be located outside the accommodating groove 50. Thus, the radiation effect of the first antenna 82 may be improved, thereby improving positioning precision.

The first antenna 82 may be arranged on the movable support 30. When the movable support 30 moves out of the accommodating groove 50, the first antenna 82 may be located outside the case 20 for transmitting electromagnetic signals. Accordingly, influence of the display 10 and other devices on the first antenna 82 may be reduced, thereby improving the radiation effect of the first antenna 82. When the movable support 30 is received in the accommodating groove 50, the first antenna 82 may be hidden in the case 20, such that the portability of the electronic device 500 may be improved. Furthermore, the arrangement of the first antenna 82 does not occupy the display area of the display 10, which allows the increase of screen-to-body ratio. Thus, user experience may be improved.

The present disclosure further provides a mobile terminal. The structure of the mobile terminal may be similar to the electronic device as described in any one of the above embodiments. For example, the mobile terminal may include a case, a movable support and a first circuit board. The case may include a middle frame and a back case, and the middle frame and the back case may cooperatively define an accommodating groove. The movable support may be integrated with a first antenna, and be slidably connected with the case. Thus, the movable support may move out of or back in to the accommodating groove. The first circuit board may be installed on the middle frame. Furthermore, the first circuit board may be electrically connected with the first antenna through a flexible printed circuit or a transmission wire so as to provide driving signals to the first antenna.

The present disclosure further provides an antenna assembly. The antenna assembly may include a movable support, an antenna and a functional device. The movable support may be adapted to be slidably connected to a case of an electronic device. The antenna may be installed on the movable support such that the antenna may move along with the movable support with respect to case of the electronic device where the movable support is connected. The functional device may also be installed on the movable support. The functional device may correspond to at least one of: a camera, a flash, a structured light sensor, a proximity sensor, a light sensor, a phone receiver and the like.

The foregoing is merely embodiments of the present disclosure. It should be pointed out that for those skilled in the art, a number of improvements and modifications may be made without departing from the principle of the embodiments of the present disclosure. These improvements and modifications should also be considered in the scope of the present disclosure.

What is claimed is:

1. An electronic device, comprising:
a case defining an accommodating groove;
a movable support slidably connected to the case, and capable of moving out of or retracting into the accommodating groove; and
a first antenna installed on the movable support;
wherein the case comprises a middle frame having a support plate and a side frame surrounding the support plate, the side frame defining an opening and the support plate defining an avoiding space corresponding to a location of the opening, the opening and the avoiding space constituting the accommodating groove; and
the side frame is divided into a plurality of frame-bodies spaced apart from each other by a plurality of spacing portions, at least one of the plurality of frame-bodies acts as a second antenna.

2. The electronic device of claim 1, further comprising:
a first circuit board connected to the case; and
a transmission wire electrically connected between the first circuit board and the first antenna, wherein the transmission wire is capable of stretching or contracting in accordance with a movement of the movable support.

3. The electronic device of claim 2, further comprising:
a guiding component connected to the case or the movable support and configured to limit a movement of the transmission wire so as to guide the transmission wire.

4. The electronic device of claim 3, wherein
the guiding component is an elastic component, one end of the elastic component connects to the case, the other end of the elastic component connects to the transmission wire;
when the transmission wire is stretching or contracting, the elastic component deforms and applies traction force on the transmission wire so as to limit the movement of the transmission wire.

5. The electronic device of claim 3, wherein
the guiding component is a guiding rod;
a first end of the guiding component is connected with the movable support, and a second end of the guiding component abuts the transmission wire such that the transmission wire is capable of sliding on a surface of the second end of the guiding component when stretching or contracting.

6. The electronic device of claim 2, further comprising a display, wherein
the display and the case cooperatively define an inner space of the electronic device, and the first circuit board is located in the inner space;
the case comprises a back cover, the back cover defines the accommodating groove, the back cover forms at least part of a groove bottom and a groove wall of the accommodating groove, the groove bottom and the groove wall insulate the inner space from external environment.

7. The electronic device of claim 6, wherein
the groove bottom or the groove wall defines a through hole, and the transmission wire passes through the through hole to connect the first antenna with the first circuit board.

8. The electronic device of claim 2, further comprising a display, wherein
the display, the movable support and the case cooperatively define an inner space of the electronic device, the first circuit board is located in the inner space;
the case comprises a middle frame and a back cover cooperatively defining the accommodating groove, the accommodating groove extends through the middle frame and the back cover along a thickness direction of the electronic device, and a moving direction of the movable support is substantially perpendicular to the thickness direction of the electronic device;
the movable support comprises a tongue portion protruding towards the inner space;
when the movable support is ejected out of the accommodating groove, the tongue is located at least partially in the accommodating groove, and insulates the inner space from external environment.

9. The electronic device of claim 8, wherein
when the movable support is received in the accommodating groove, the tongue is inserted in the inner space between the middle frame and the display; or
when the movable support is received in the accommodating groove, the tongue is inserted in the inner space between the middle frame and the back cover.

10. The electronic device of claim 8, wherein
the back cover defines a inserting slot communicating with the accommodating groove;
when the movable support is received in the accommodating groove, the tongue is inserted in the inserting slot.

11. The electronic device of claim 1, wherein
the first antenna is a conductive material layer formed on a surface of the movable support; or
the first antenna is a flexible printed circuit board arranged on a surface of the movable support; or
the first antenna forms part of the movable support and acts as an outer-frame of the movable support.

12. The electronic device of claim 1, wherein
the case defines a latch slot;
the movable support comprises a support body and a lock component slidably connected to the support body, the first antenna is installed on the support body;
the lock component is capable of moving partially into the latch slot to lock the movable support and moving out of the latch slot to release the movable support.

13. The electronic device of claim 12, further comprising:
an elastic support disposed between the case and the support body, and the elastic support is configured to push the movable support out of the accommodating groove by elastic force when the movable support is released.

14. The electronic device of claim 12, further comprising:
an elastic resetting component connected between the lock component and the support body, the elastic resetting component is configured to push the lock component partially into the latch slot by elastic force when the lock component faces directly the latch slot and is not hold by a user.

15. The electronic device of claim 1, further comprising:
a driving component connected with the movable support, and configured to drive the movable support to move out of or retract into the accommodating groove.

16. The electronic device of claim 1, further comprising:
a functional device integrated in the movable support, wherein the functional device is at least one of a camera, a flash, a structured light sensor, a proximity sensor, a light sensor or a phone receiver.

17. The electronic device of claim 1, further comprising:
an antenna switch connected to the movable support or the case;
different match circuits with different parameters each connected between the antenna switch and the first antenna;
wherein the antenna switch is configured to select one of the match circuit for correcting frequency offset of the first antenna due to movement of the movable support.

18. A mobile terminal, comprising:
a case comprising a middle frame and a back case, wherein the middle frame and the back case cooperatively define an accommodating groove;
a movable support integrated with a first antenna, the movable support being slidably connected with the case, and capable of moving out of or retracting into the accommodating groove; and
a first circuit board installed on the middle frame and electrically connected with the first antenna to provide driving signals to the first antenna;

wherein the case defines a latch slot;

the movable support comprises a support body and a lock component slidably connected to the support body, the first antenna is installed on the support body;

the lock component is capable of moving partially into the latch slot to lock the movable support and moving out of the latch slot to release the movable support.

19. An antenna assembly with a functional device, comprising:

a movable support adapted to be slidably connected to a case of an electronic device;

a first antenna installed on the movable support; and a functional device installed on the movable support, wherein the functional device comprises at least one of: a camera, a flash, a structured light sensor, a proximity sensor, a light sensor or a phone receiver;

wherein the antenna assembly further comprises an antenna switch connected to the movable support or the case;

different match circuits with different parameters each connected between the antenna switch and the first antenna;

wherein the antenna switch is configured to select one of the match circuit for correcting frequency offset of the first antenna due to movement of the movable support.

* * * * *

UNITED STATES PATENT AND TRADEMARK OFFICE
CERTIFICATE OF CORRECTION

PATENT NO. : 10,854,955 B2  
APPLICATION NO. : 16/265499  
DATED : December 1, 2020  
INVENTOR(S) : Xinbao Wang et al.

Page 1 of 1

It is certified that error appears in the above-identified patent and that said Letters Patent is hereby corrected as shown below:

On the Title Page

Item (71):  
Delete "Guangdong (CN)"  
Insert --Dongguan, Guangdong (CN)--

Item (73):  
Delete "Guangdong (CN)"  
Insert --Dongguan, Guangdong (CN)--

Signed and Sealed this  
Twenty-third Day of March, 2021

Drew Hirshfeld  
*Performing the Functions and Duties of the*  
*Under Secretary of Commerce for Intellectual Property and*  
*Director of the United States Patent and Trademark Office*